US012748212B2

(12) United States Patent
Sawahashi et al.

(10) Patent No.: US 12,748,212 B2
(45) Date of Patent: Sep. 29, 2026

(54) INFORMATION PROCESSING APPARATUS, INFORMATION PROCESSING METHOD, AND INFORMATION PROCESSING PROGRAM

(71) Applicant: Sony Group Corporation, Tokyo (JP)

(72) Inventors: Ryota Sawahashi, Tokyo (JP); Masataka Toyoura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 118 days.

(21) Appl. No.: 18/726,131

(22) PCT Filed: Jan. 17, 2023

(86) PCT No.: PCT/JP2023/001086
§ 371 (c)(1),
(2) Date: Jul. 2, 2024

(87) PCT Pub. No.: WO2023/145529
PCT Pub. Date: Aug. 3, 2023

(65) Prior Publication Data

US 2025/0067875 A1 Feb. 27, 2025

(30) Foreign Application Priority Data

Jan. 31, 2022 (JP) ................................ 2022-012875

(51) Int. Cl.
*G01S 17/931* (2020.01)
*G01C 21/20* (2006.01)
*G01S 17/894* (2020.01)

(52) U.S. Cl.
CPC .......... *G01S 17/931* (2020.01); *G01C 21/206* (2013.01); *G01S 17/894* (2020.01)

(58) Field of Classification Search
CPC .... G01S 17/931; G01S 17/894; G01C 21/206
See application file for complete search history.

(56) References Cited

U.S. PATENT DOCUMENTS

2005/0131581 A1* 6/2005 Sabe .................... G05D 1/0251 700/245
2015/0362921 A1* 12/2015 Hanaoka .............. G05D 1/0248 702/159
2021/0141092 A1 5/2021 Chen et al.

FOREIGN PATENT DOCUMENTS

JP 2005-092820 A 4/2005
JP 2006-260105 A 9/2006
(Continued)

OTHER PUBLICATIONS 3D is here: Point Cloud Library (PCL) | IEEE Conference Publication | IEEE Xplore https://ieeexplore.ieee.org/document/5980567 (Year: 2011).*
(Continued)

*Primary Examiner* — Angela Y Ortiz
*Assistant Examiner* — Jeffrey R Chalhoub
(74) *Attorney, Agent, or Firm* — XSENSUS LLP

(57) ABSTRACT

To provide an information processing apparatus, an information processing method, and an information processing program that enable detection of a non-planar environment at low cost. The information processing apparatus according to an embodiment includes: a detection unit that detects an obstacle location that becomes obstruction for traveling in a traveling direction on the basis of a three-dimensional point cloud determined to be a traveling surface and a two-dimensional point cloud corresponding to the traveling direction.

16 Claims, 18 Drawing Sheets

(56) References Cited

FOREIGN PATENT DOCUMENTS

| | | | | |
|---|---|---|---|---|
| WO | 2014/132509 A1 | | 9/2014 | |
| WO | 2017/061375 A1 | | 4/2017 | |
| WO | WO-2019176278 A1 | * | 9/2019 | ............... G05D 1/02 |

OTHER PUBLICATIONS

International Search Report and Written Opinion mailed on Mar. 7, 2023, received for PCT Application PCT/JP2023/001086, filed on Jan. 17, 2023, 9 pages including English Translation.

* cited by examiner (a)

(b)

(c)

(a)

(b)

(a)

(b)

INFORMATION PROCESSING APPARATUS, INFORMATION PROCESSING METHOD, AND INFORMATION PROCESSING PROGRAM

CROSS-REFERENCE TO RELATED APPLICATIONS

The present application is based on PCT filing PCT/JP2023/001086, filed Jan. 17, 2023, which claims priority from Japanese Patent Application No. 2022-012875, filed Jan. 31, 2022, the entire contents of each are incorporated herein by reference.

FIELD

The present disclosure relates to an information processing apparatus, an information processing method, and an information processing program.

BACKGROUND

An autonomous mobile body that autonomously travels is known. In the autonomous mobile body, a sensor is used to detect a surrounding state, and a traveling speed, a traveling direction, and the like are controlled according to the detected state to realize the autonomous traveling.

CITATION LIST

Patent Literature

Patent Literature 1: JP 2005-92820 A

SUMMARY

Technical Problem

In an autonomous mobile body assuming indoor traveling, a moving environment is often assumed to be a plane, and for example, a two Dimensions-Laser Imaging Detection and Ranging (2D-LiDAR) is mounted as a sensor to two-dimensionally detect an obstacle on a traveling surface. Therefore, conventionally, there have been problems that a climbable slope is recognized as an obstacle, a depression such as a hole is difficult to be detected on the traveling surface, and the like.

In response to this, it is conceivable to have the autonomous mobile body mounted with a sensor that can acquire three-dimensional information and use the sensor to accumulate and analyze the surrounding state as the three-dimensional information. However, the accumulation and analysis of three-dimensional information increases the amount of data and calculation, which increases the cost.

An object of the present disclosure is to provide an information processing apparatus, an information processing method, and an information processing program that enable detection of a non-planar environment at low cost.

Solution to Problem

For solving the problem described above, an information processing apparatus according to one aspect of the present disclosure has a detection unit that detects an obstacle location that becomes obstruction for traveling in a traveling direction on a basis of a three-dimensional point cloud determined to be a traveling surface and a two-dimensional point cloud corresponding to the traveling direction.

DESCRIPTION OF EMBODIMENTS

Figure 1:
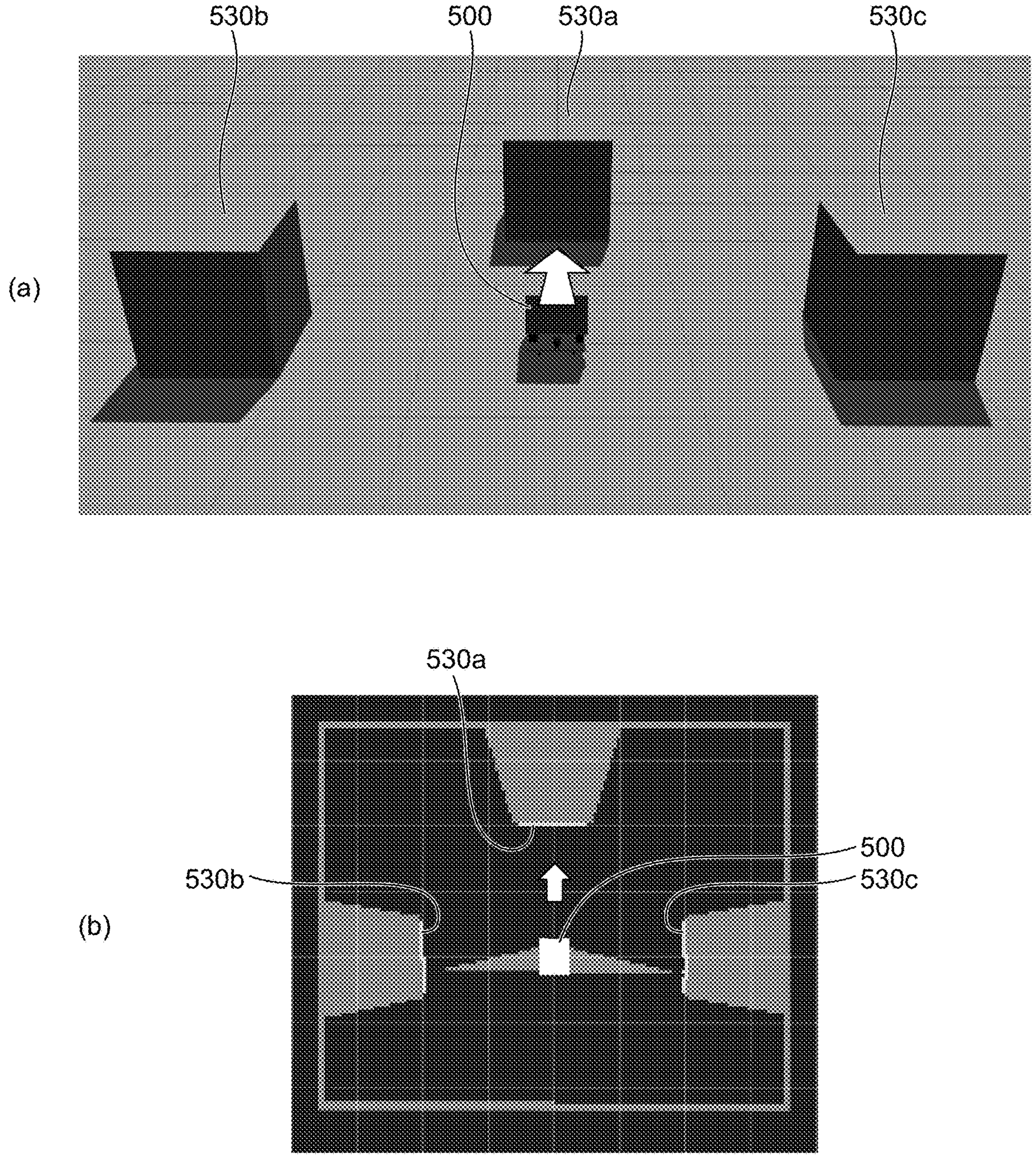
FIG. 1 is a schematic diagram illustrating an example of a 2D obstacle map created by using a 2D-LiDAR according to an existing technology.

Hereinafter, embodiments of the present disclosure will be described in detail with reference to the drawings. Note that, in the following embodiments, the same parts are denoted by the same reference numerals, and redundant description will be omitted.

Hereinafter, the embodiments of the present disclosure will be described in the following order.

1. Obstacle location detection by existing technology
2. Embodiment
   2-1. Outline of the embodiment
   2-2. Configuration according to the embodiment
   2-3. Processing according to the embodiment
3. Other embodiments

1. Obstacle Location Detection by Existing Technology

Prior to describing the embodiment of the present disclosure, obstacle location detection by existing techniques will be schematically described for easy understanding.

An autonomous mobile body detects a surrounding obstacle (obstacle location) by using an external sensor. Further, the autonomous mobile body is required to travel in a non-planar environment such as a slope or a depression (dip) in order to expand an activity range. In general, the autonomous mobile body, specifically the autonomous mobile body assuming indoor traveling, often uses a two Dimensions-Laser Imaging Detection and Ranging (2D-LiDAR) as the external sensor.

FIG. 1 is a schematic diagram illustrating an example of a 2D obstacle map created by using the 2D-LiDAR according to the existing technology. In FIG. 1, a section (a) illustrates a mobile body 500 and objects 530*a*, 530*b*, and 530*c* around the mobile body 500 in an overhead view. It is assumed that the mobile body 500 has a direction indicated by an arrow in the drawing as an advancing direction, and can detect at a viewing angle of about 200° by the 2D-LiDAR.

A section (b) in FIG. 1 is a diagram schematically illustrating an example of a 2D obstacle map created on the basis of the detection result obtained by the 2D-LiDAR. In the example of the section (b), the 2D obstacle map displays, as two-dimensional information, a surface of each of the objects 530*a*, 530*b*, and 530*c* facing the 2D-LiDAR and a portion that is shaded by the surface with respect to the 2D-LiDAR. It can be seen from the two-dimensional obstacle map that the object 530*a* is possibly an obstacle in the advancing direction of the mobile body 500.

Although it is possible to determine the presence of an object by using the 2D-LiDAR, it is difficult to determine whether the determined object is the obstacle or the traveling surface from the determination result of the 2D-LiDAR. That is, in the 2D-LiDAR, because the determination is performed on the two-dimensional surface according to the installation height and the angle, it has been difficult to determine whether the detected object is an obstacle or a portion of a slope where the autonomous mobile body can climb.

Figure 2:
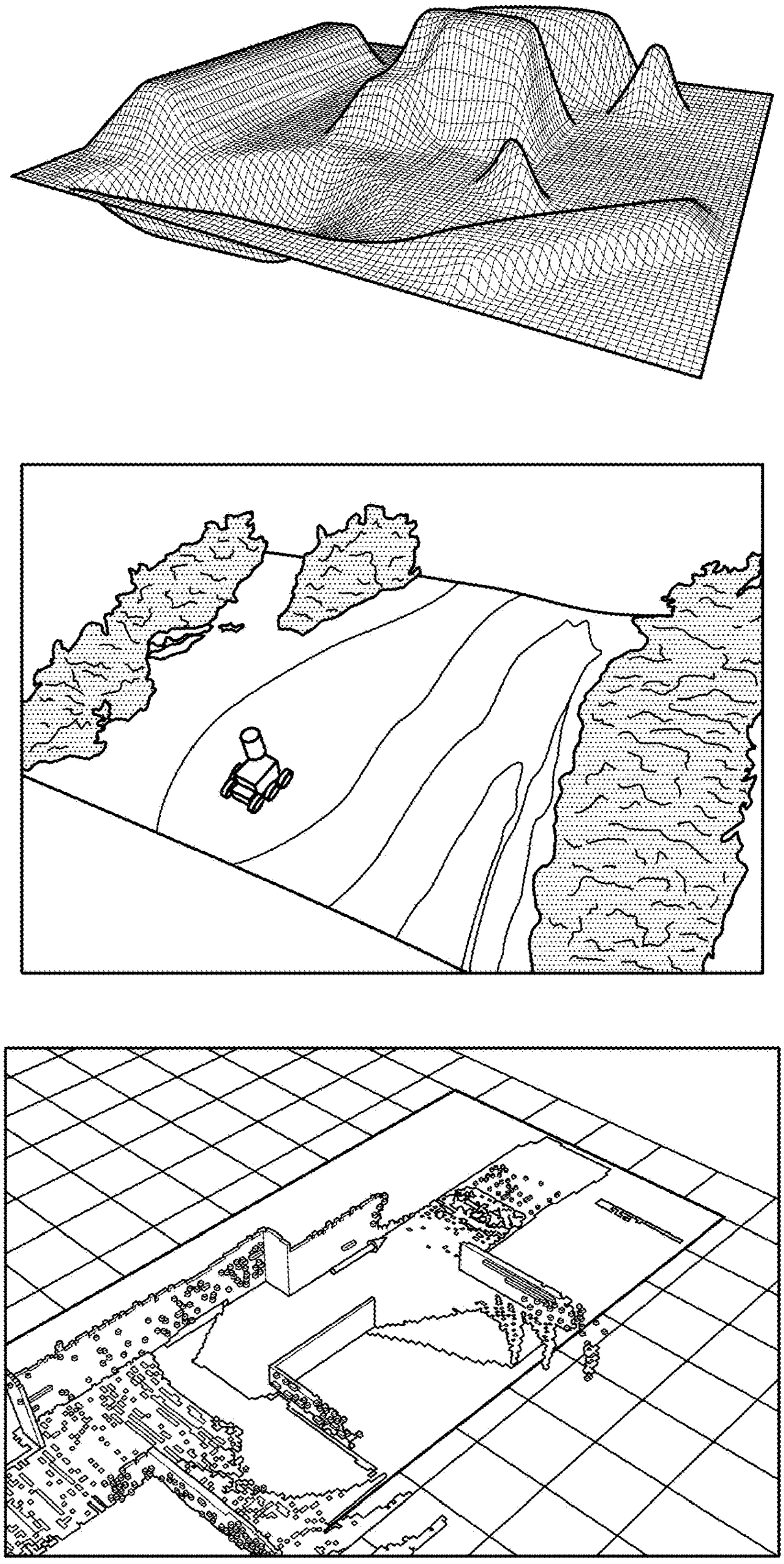
FIG. 2 is a schematic diagram illustrating an example of a map based on three-dimensional information.

Furthermore, it is also conceivable to accumulate external information as three-dimensional information to determine an obstacle. FIG. 2 is a schematic diagram illustrating an example of a map based on the three-dimensional information. In FIG. 2, a section (a) illustrates an example of a map by contour lines, a section (b) illustrates an example of a map by 3D mesh, and a section (c) illustrates an example of a map by voxels. The map based on these pieces of three-dimensional information is created by obtaining three-dimensional coordinates for each measurement point, and an amount of necessary information is much larger than that of the two-dimensional obstacle map.

The travel control of the autonomous mobile body is greatly affected by an amount of data of the map and processing speed related to map creation. Therefore, it has been difficult to accumulate the three-dimensional information, perform processing, and perform travel control of the autonomous mobile body.

Figure 3:
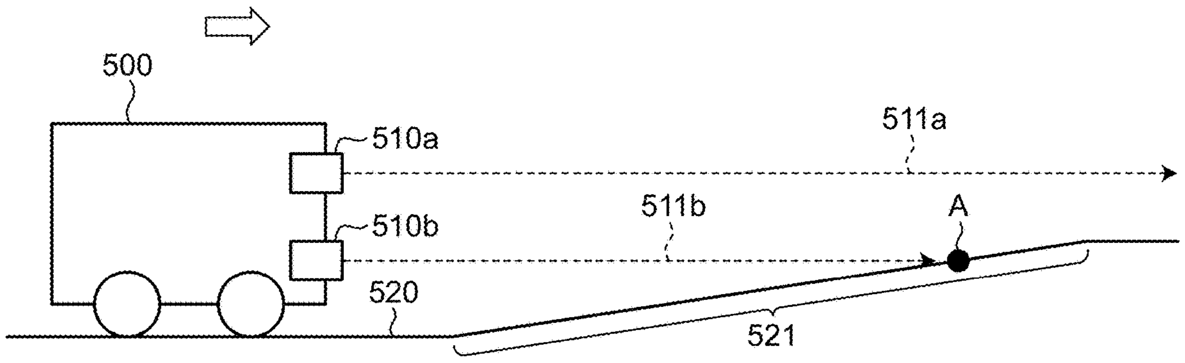
FIG. 3 is a schematic diagram for explaining acquisition of height information by using a plurality of 2D-LiDARs installed at different heights.

On the other hand, as illustrated in FIG. 3, it is also conceivable to acquire height information by using a plurality of 2D-LiDARs installed at different heights. In FIG. 3, in the mobile body 500, two 2D-LiDARs 510*a* and 510*b* are mounted at different heights. It is assumed that the 2D-LiDARs 510*a* and 510*b* perform scans 511*a* and 511*b* on a horizontal plane at a height where each of the 2D-LiDARs is mounted. In a traveling surface 520 on which the mobile body 500 travels, a predetermined section is an upward slope 521 with respect to the traveling direction of the mobile body 500.

The 2D-LiDAR 510*b* mounted at the low position can detect a position A of the height on the slope by the scan 511*b*, the height corresponding to that of the mounted height of the 2D LiDAR 510*b*. In this case, because a shape cannot be obtained from the output of the 2D-LiDAR 510*b*, this slope 521 is detected as an obstacle to traveling of the mobile body 500. On the other hand, the 2D-LiDAR 510*a* is mounted, for example, at a position higher than the height of the slope, and cannot detect an obstacle whose height is low (the slope 521 in this example). Therefore, it is preferable that the 2D-LiDAR is mounted at a low position to some extent.

2. Embodiment

Next, an embodiment of the present disclosure will be described.

(2-1. Outline of the Embodiment)

First, an embodiment of the present disclosure will be schematically described. In the embodiment, a 3D distance measurement sensor that performs distance measurement by using three-dimensional information and a 2D distance measurement sensor that performs distance measurement by using two-dimensional information are used to detect an obstacle location that becomes obstruction for traveling of a mobile body on a traveling surface.

The 3D distance measurement sensor performs distance measurement by a three-dimensional point cloud (hereinafter, 3D point cloud) that is a set of points each having three-dimensional information, and for example, a depth camera may be applied. The 2D distance measurement sensor performs distance measurement by a two-dimensional point cloud (hereinafter, 2D point cloud) that is a set of points each having two-dimensional information, and for example, the 2D-LiDAR may be applied. In the embodiment, the obstacle location is detected on the basis of the 3D point cloud determined as the traveling surface and the 2D point cloud corresponding to the traveling direction.

Figure 4A:
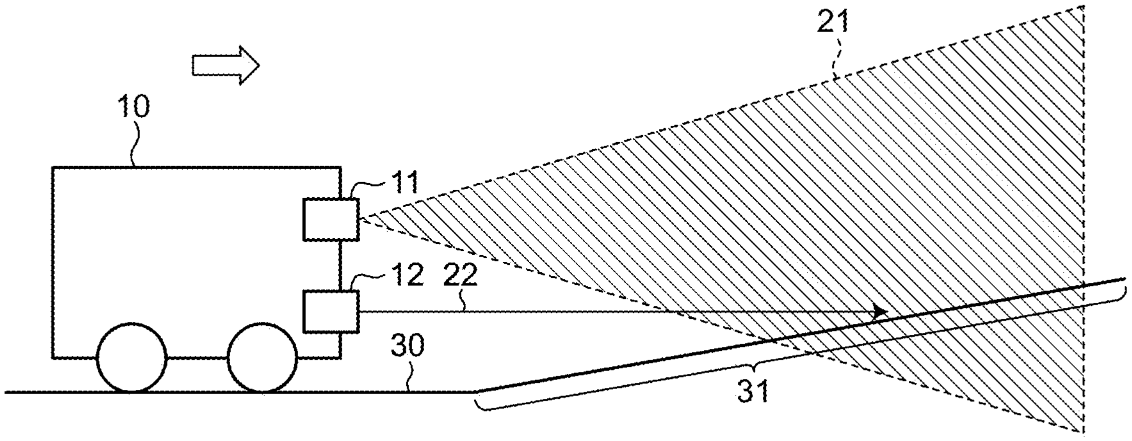
FIG. 4A is a schematic diagram illustrating an example of mounting a 3D distance measurement sensor and a 2D distance measurement sensor on a mobile body according to an embodiment.
Figure 4B:
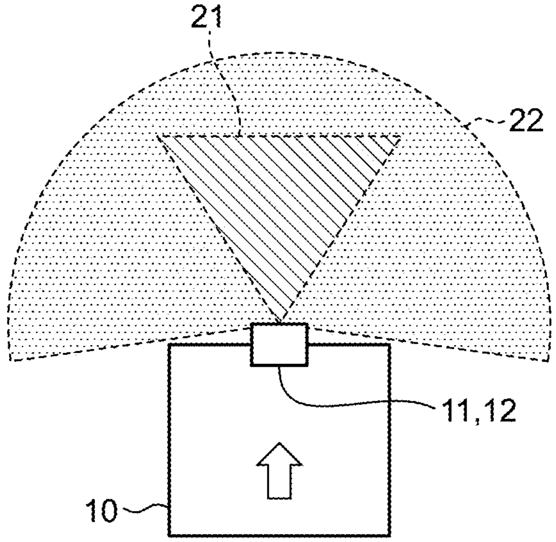
FIG. 4B is a schematic diagram illustrating an example of mounting a 3D distance measurement sensor and a 2D distance measurement sensor on the mobile body according to the embodiment.

FIGS. 4A and 4B are schematic diagrams illustrating an example of mounting the 3D distance measurement sensor and the 2D distance measurement sensor on the mobile body according to the embodiment. FIG. 4A is a view illustrating an example in which a mobile body 10 is viewed from the side surface, and FIG. 4B is a view illustrating an example in which the mobile body 10 is viewed from the top surface.

In FIG. 4A, a 3D distance measurement sensor 11 and a 2D distance measurement sensor 12 are mounted on the mobile body 10. The 3D distance measurement sensor 11 is mounted at a position higher than the 2D distance measurement sensor 12. Here, it is assumed that the mobile body 10 travels on a traveling surface 30 from left to right in the drawing as indicated by an arrow in the drawing. Furthermore, assuming that the surface on the traveling direction side of the mobile body 10 is the front surface, the 3D distance measurement sensor 11 and the 2D distance measurement sensor 12 are mounted on the front surface of the mobile body 10 so as to perform scanning in the traveling direction.

As illustrated in FIGS. 4A and 4B, the 3D distance measurement sensor 11 scans a distance measurement range 21 in a predetermined angular range with respect to the space in the traveling direction of the mobile body 10. The 3D distance measurement sensor 11 has a pixel array in which pixels as reception elements that receive light and output electrical signals are arranged in a predetermined array such as a lattice array. The 3D distance measurement sensor 11 acquires three-dimensional information of each point corresponding to each pixel on the basis of each signal output by each pixel included in the pixel array. The 3D distance measurement sensor 11 generates a 3D point cloud on the basis of the acquired three-dimensional information of each point. The 3D point cloud is a set of points each including, for example, position information represented by coordinates (x,y,z).

A method used by the 3D distance measurement sensor 11 is not particularly limited. For example, direct-Time of Flight (dToF)-LiDAR using a dToF method for performing distance measurement on the basis of a difference between a light reception timing at which reflected light obtained by reflecting laser light on a measurement target object is received and a light emission timing of the laser light can be applied as the method used by the 3D distance measurement sensor 11. Not limited to this, a 3D stereo camera that acquires three-dimensional information by triangulation may be applied as the 3D distance measurement sensor 11.

The 2D distance measurement sensor 12 scans a plane starting from a mounting position of the 2D distance measurement sensor 12 as a distance measurement range 22 in a direction of the front surface of the mobile body 10. The 2D distance measurement sensor 12 has a pixel array in which pixels are arranged in a predetermined array such as a line. The 2D distance measurement sensor 12 acquires two-dimensional information of each point corresponding to each pixel on the basis of each signal output by each pixel included in the pixel array. The 2D distance measurement sensor 12 generates a 2D point cloud on the basis of the acquired two-dimensional information of each point. In a case where the plane of the distance measurement range 22 is parallel to the xy plane in the distance measurement range 21 of the 3D distance measurement sensor 11, the 2D point cloud is a set of points each including coordinates (x, y).

A method used by the 2D distance measurement sensor 12 is not particularly limited. A 2D-LiDAR that performs distance measurement using laser light can be applied as the 2D distance measurement sensor 12. Not limited to this, a radar that performs distance measurement by using millimeter waves can be applied as the 2D distance measurement sensor 12.

As illustrated in FIG. 4A, the mobile body 10 can detect the presence of a portion of the traveling surface 30 whose height is higher by a predetermined height or more than the surface currently traveling, on the basis of the 2D point cloud acquired by scanning the distance measurement range 22 by the 2D distance measurement sensor 12. The mobile body 10 can further detect a slope 31 of the traveling surface 30 based on the 3D point cloud acquired by scanning the distance measurement range 21 by the 3D distance measurement sensor 11.

Furthermore, as illustrated in FIG. 4B, the distance measurement range 22 of the 2D distance measurement sensor 12 is wider and extends longer in the horizontal direction than the distance measurement range 21 of the 3D distance measurement sensor 11. Therefore, the 2D distance measurement sensor 12 can detect an obstacle location outside the range (for example, in the far direction and the lateral direction) of the distance measurement range 21 of the 3D distance measurement sensor 11. Furthermore, as illustrated in FIG. 4A, by mounting the distance measurement range 22 of the 2D distance measurement sensor 12 at a position lower than the 3D distance measurement sensor 11, it is possible to detect the obstacle location outside the range of the distance measurement range 21 of the 3D distance measurement sensor 11 in the vertical direction (for example, a foot position of the mobile body 10).

In a case where only the 2D distance measurement sensor 12 is used, the slope 31 is detected as an obstacle location. On the other hand, in the embodiment, because the 2D point cloud obtained by the 2D distance measurement sensor 12 and the 3D point cloud obtained by the 3D distance measurement sensor 11 are integrated, the obstacle location can be detected with higher accuracy. Meanwhile, there is possibly a case where the mobile body 10 autonomously travels mainly indoors. In the indoor environment, the traveling surface 30 is basically a plane. Therefore, a sensor that can acquire two-dimensional information in a wide range, such as the 2D distance measurement sensor 12, is useful.

Figure 5:
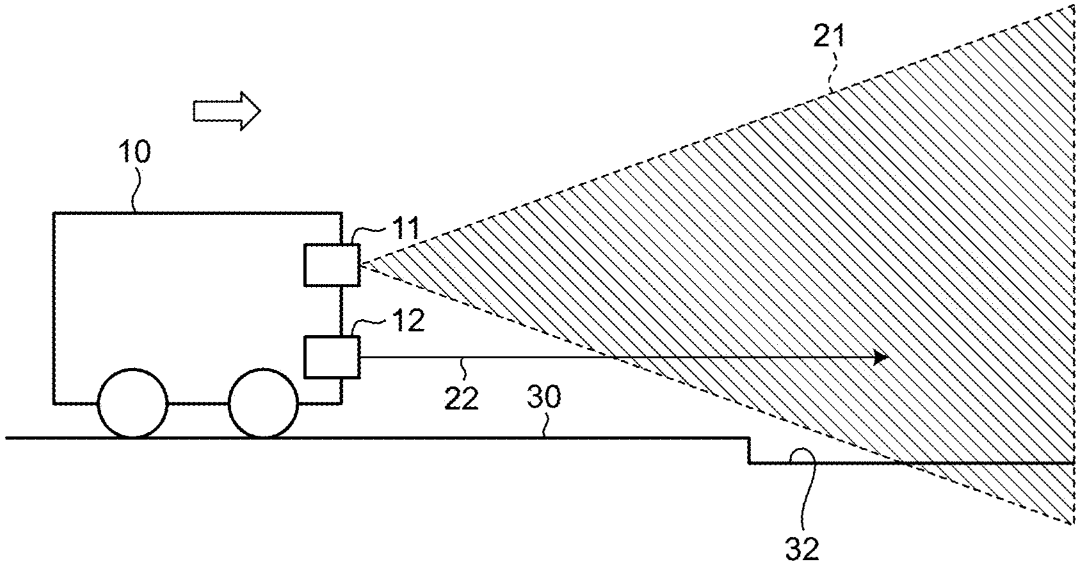
FIG. 5 is a schematic diagram for explaining detection of a depression according to the embodiment.

Furthermore, in the embodiment, because the 3D distance measurement sensor 11 is used, a depression on the traveling surface 30 can be detected. FIG. 5 is a schematic diagram for explaining detection of the depression according to the embodiment. In the example of FIG. 5, a depression 32 having a height lower than that of the traveling surface 30 exists in the traveling direction of the mobile body 10 on the traveling surface 30. In a case where the distance measurement range 21 of the 3D distance measurement sensor 11 includes the depression 32, the depression 32 can be detected as the obstacle location on the basis of the output of the 3D distance measurement sensor 11.

Note that, in the above description, one 3D distance measurement sensor 11 and one 2D distance measurement sensor 12 are mounted on the mobile body 10, but the present invention is not limited to this example. That is, a plurality of the 3D distance measurement sensors 11 and a plurality of the distance measurement sensors 12 may be mounted on the mobile body 10. Furthermore, the plurality of 3D distance measurement sensors 11 and the plurality of 2D distance measurement sensors 12 may be mounted not only on the front surface of the mobile body 10 but also on the side surface or the rear surface of the mobile body 10. For example, the 3D distance measurement sensor 11 and the 2D distance measurement sensor 12 can be mounted on the front surface and the rear surface, and the left and right side surfaces of the mobile body 10, respectively.

(2-2. Configuration According to the Embodiment)

Figure 6:
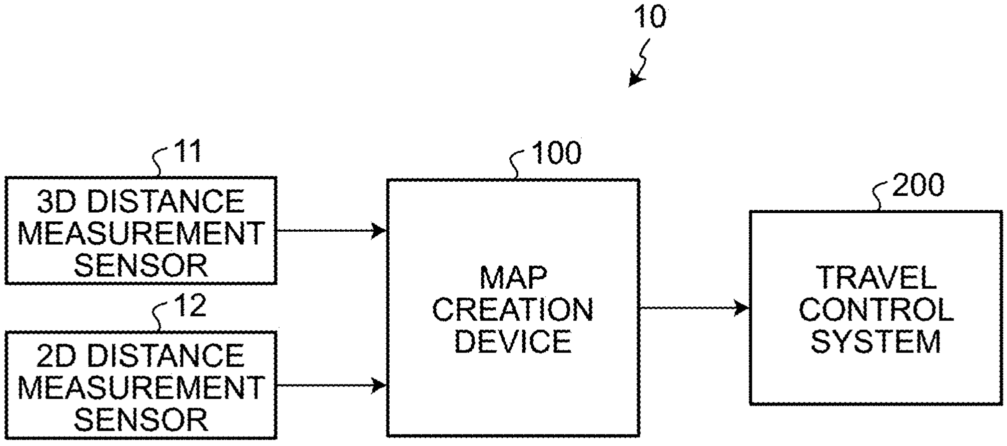
FIG. 6 is a block diagram schematically illustrating an example of a system configuration of the mobile body according to the embodiment.

Next, a configuration according to the embodiment will be described. FIG. 6 is a block diagram schematically illustrating an example of a system configuration of the mobile body 10 according to the embodiment. In FIG. 6, the mobile body 10 includes the 3D distance measurement sensor 11, the 2D distance measurement sensor 12, a map creation device 100, and a travel control system 200.

On the basis of the 3D point cloud output from the 3D distance measurement sensor 11 and the 2D point cloud output from the 2D distance measurement sensor 12, the map creation device 100 detects an obstacle location that possibly becomes obstruction for traveling of the mobile body 10. The map creation device 100 creates an obstacle location map on the basis of the detected obstacle location. The travel control system 200 performs travel control of the mobile body 10 on the basis of the obstacle location map created by the map creation device 100.

The map creation device 100 estimates a normal line for each point included in the 3D point cloud acquired by the 3D distance measurement sensor 11, and on the basis of normal line information indicating the estimated normal line, determines whether or not a point corresponding to the normal line information is a point of the obstacle location with respect to the mobile body 10. Furthermore, the map creation device 100 integrates the 3D point cloud and the 2D point cloud acquired by the 2D distance measurement sensor 12, which are each determined to be a traveling surface, performs clustering on the integrated point cloud in units of divided areas obtained by dividing an area by a grid of XY axes, and obtains which divided area the obtained point cloud belongs to. The map creation device 100 determines whether or not the target divided area is the obstacle location on the basis of the height difference between the point cloud of the target divided area and the point cloud of the surrounding grid.

Figure 7:
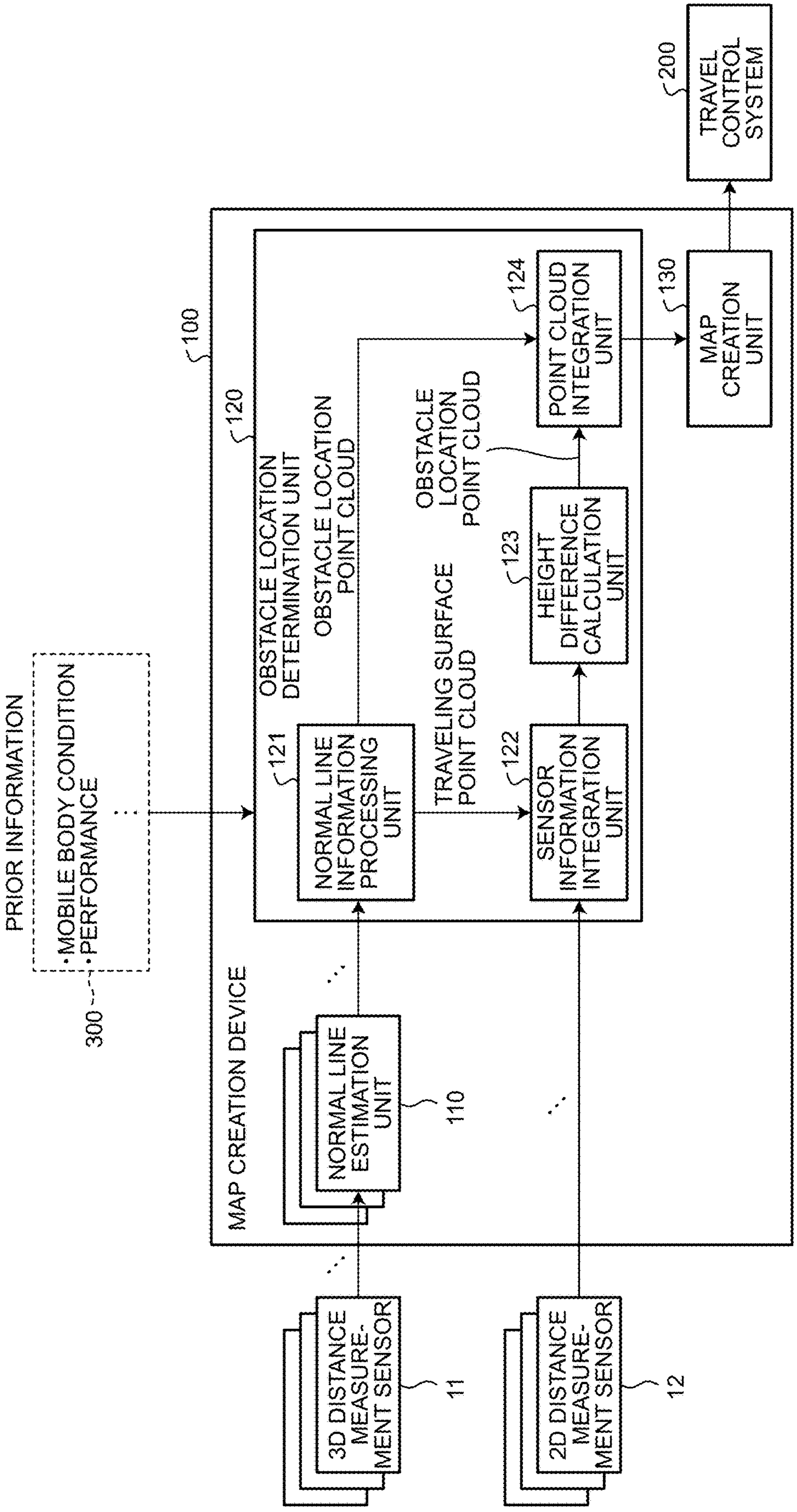
FIG. 7 is a functional block diagram of an example for explaining functions of a map creation device according to the embodiment.

FIG. 7 is a functional block diagram of an example for explaining functions of the map creation device 100 according to the embodiment. In FIG. 7, the map creation device 100 includes a normal line estimation unit 110, an obstacle location determination unit 120, and a map creation unit 130. In a case where the plurality of 3D distance measurement sensors 11 are mounted on the mobile body 10, the normal line estimation unit 110 is provided for each of the plurality of 3D distance measurement sensors 11 on a one-to-one basis.

The normal line estimation unit 110, the obstacle location determination unit 120, and the map creation unit 130 are constituted by executing an information processing program according to the embodiment on a Central Processing Unit (CPU). Not limited to this, part or all of the normal line estimation unit 110, the obstacle location determination unit 120, and the map creation unit 130 may be constituted of hardware circuits that operate in cooperation with each other.

The normal line estimation unit 110 estimates a normal line for each point included in the 3D point cloud output from the 3D distance measurement sensor 11. The normal line information estimated by the normal line estimation unit 110 is output to the obstacle location determination unit 120.

The obstacle location determination unit 120 includes a normal line information processing unit 121, a sensor information integration unit 122, a height difference calculation unit 123, and a point cloud integration unit 124. In addition, information indicating conditions and performance of the mobile body 10 is input to the obstacle location determination unit 120 as prior information 300. The prior information 300 can include, for example, respective ability values such as a slope climbing ability and a step climbing ability of the mobile body 10.

The obstacle location determination unit 120 functions as a detection unit that detects an obstacle location that becomes obstruction for traveling in the traveling direction on the basis of the three-dimensional point cloud determined to be the traveling surface and the two-dimensional point cloud corresponding to the traveling direction.

The function of the obstacle location determination unit 120 will be described more specifically. In the obstacle location determination unit 120, the normal line information processing unit 121 acquires the normal line information output from the normal line estimation unit 110 and performs processing based on the acquired normal line information. On the basis of the acquired normal line information, the normal line information processing unit 121 classifies points corresponding to the normal line information into either a traveling surface point cloud that is a point cloud indicating the traveling surface or an obstacle location point cloud that is a point cloud indicating the obstacle location. The normal line information processing unit 121 outputs the traveling surface point cloud to the sensor information integration unit 122 and outputs the obstacle location point cloud to the point cloud integration unit 124. Each of the traveling surface point cloud and the obstacle location point cloud is a normal line-added point cloud in which the normal line information is added to the included points. The normal line information can include information indicating an angle of the normal line.

The 2D point cloud output from the 2D distance measurement sensor 12 is input to the sensor information integration unit 122. The sensor information integration unit 122 integrates the traveling surface point cloud output from the normal line information processing unit 121 and the 2D point cloud output from the 2D distance measurement sensor 12. The sensor information integration unit 122 performs clustering on the integrated point cloud (referred to as an integrated point cloud) in units of divided areas obtained by dividing an area by a grid of a predetermined size, and determines an integrated point cloud included in each divided area. The sensor information integration unit 122 outputs an integrated point cloud and information indicating the divided area including the integrated point cloud.

The height difference calculation unit 123 calculates the height difference of each point included in the integrated point cloud on the basis of the information indicating the integrated point cloud and the divided area output from the sensor information integration unit 122, and determines whether or not the target divided area is the obstacle location. The height difference calculation unit 123 outputs the integrated point cloud of the divided area determined to be the obstacle location to the point cloud integration unit 124 as the obstacle location point cloud.

The point cloud integration unit 124 integrates the obstacle location point cloud output from the normal line information processing unit 121 and the obstacle location point cloud output from the height difference calculation unit 123. The point cloud integration unit 124 outputs the point cloud obtained by integrating the two to the map creation unit 130.

The map creation unit 130 creates an obstacle location map based on the two-dimensional information on the basis of the point cloud output from the point cloud integration unit 124. The map creation unit 130 outputs the created obstacle location map to the travel control system 200. The travel control system 200 controls traveling of the mobile body 10 on the basis of the obstacle location map output from the map creation unit 130.

Figure 8:
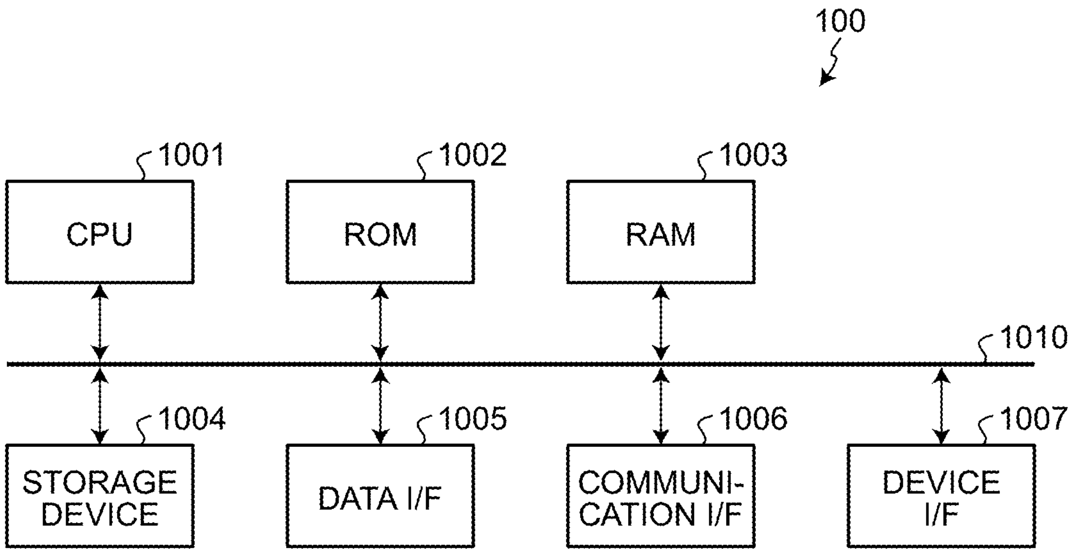
FIG. 8 is a block diagram schematically illustrating an example of a hardware configuration of the map creation device according to the embodiment.

FIG. 8 is a block diagram illustrating an example of a hardware configuration of the map creation device 100 according to the embodiment.

In FIG. 8, the map creation device 100 includes a CPU 1001, a Read Only Memory (ROM) 1002, a Random Access Memory (RAM) 1003, a storage device 1004, a data interface (I/F) 1005, a communication I/F 1006, and a device I/F 1007 which are communicably connected to each other by a bus 1010.

The storage device 1004 is a non-volatile storage medium such as a flash memory or a hard disk drive, and stores an information processing program according to the embodiment. The CPU 1001 operates the RAM 1003 as a work memory by a program stored in the storage device 1004 and/or the ROM 1002, and controls the entire operation of the map creation device 100.

As described above, the map creation device 100 according to the embodiment includes the processor and the memory, and has a configuration as an information processing apparatus such as a computer.

The data I/F 1005 inputs and outputs data to and from an external device. The data I/F 1005 may be connected to the external device by wired communication or wireless communication. The communication I/F 1006 performs communication via a network by, for example, wireless communication or priority communication. The device I/F 1007 is an interface for another device, and is connected to, for example, the 3D distance measurement sensor 11 and the 2D distance measurement sensor 12. Further, a drive mechanism for driving the mobile body 10 to travel may be connected to the device I/F 1007.

In the map creation device 100, the CPU 1001 executes the information processing program for realizing the function according to the embodiment to configure each of the normal line estimation unit 110, the obstacle location determination unit 120, and the map creation unit 130 described above as, for example, a module on a main storage area in the RAM 1003.

The information processing program can be acquired, for example, from the outside via a not-illustrated network by communication via the communication I/F 1006, and can be installed on the map creation device 100. Not limited to this, the information processing program may be provided by being stored in a detachable storage medium such as a Compact Disk (CD), a Digital Versatile Disk (DVD), or a Universal Serial Bus (USB) memory.

(2-3. Processing According to the Embodiment)

Next, processing in the map creation device 100 according to the embodiment will be described.

In the map creation device 100, the normal line estimation unit 110 estimates a normal line for each point included in the 3D point cloud output from the 3D distance measurement sensor 11. The normal line estimation unit 110 first acquires data of neighboring points of a target point among points included in the 3D point cloud.

Figure 9:
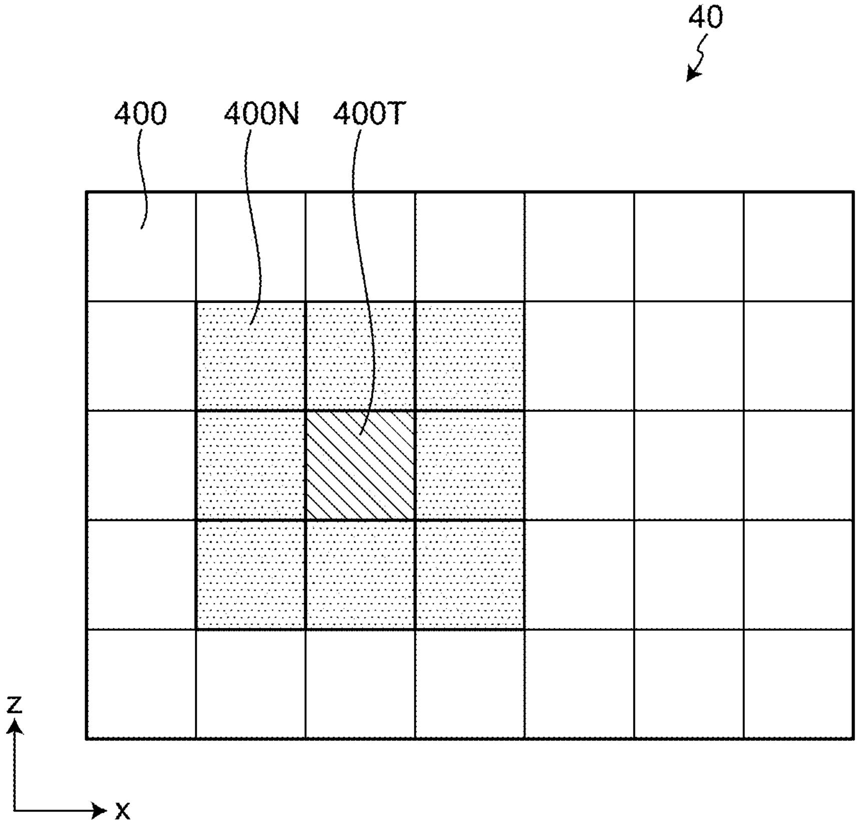
FIG. 9 is a schematic diagram for explaining a target point and neighboring points.

FIG. 9 is a schematic diagram for explaining a target point and neighboring points. In FIG. 9, a grid 40 corresponds to, for example, a pixel array of a pixel array included in the 3D distance measurement sensor 11. In FIG. 9, the vertical direction of the grid 40 is the z axis, and the horizontal direction is the x axis.

The 3D point cloud output by the 3D distance measurement sensor 11 is acquired by the normal line estimation unit 110 as, for example, information for every pixel 400 of the pixel array included in the 3D distance measurement sensor 11. In the example of FIG. 9, assuming that a pixel of the target point among the pixels 400 is a target pixel 400T, eight pixels around the target pixel 400T are neighboring pixels 400N of the neighboring points with respect to the target point.

The neighboring pixels 400N are not limited to this example. For example, 24 pixels in a range of two pixels with respect to the target pixel 400T may be used, or pixels included in a wider range around the target pixel 400T may be used. Furthermore, for example, four pixels in contact with the target pixel 400T in the x direction and the y direction may be used. Note that the points of the 3D point cloud are not necessarily included in all of the target pixel 400T and the neighboring pixels 400N. In addition, because the data array is known, it is easy for the normal line estimation unit 110 to search for the neighboring pixels 400N.

The normal line estimation unit 110 performs three-dimensional principal component analysis by using data of points acquired from the target pixel 400T and the neighboring pixels 400N. The normal line estimation unit 110 assumes the first principal component and the second principal component obtained by the principal component analysis as a plane and estimates a perpendicular line of the plane. The normal line estimation unit 110 sets the obtained perpendicular line as the normal line of the target pixel 400T.

Figure 10:
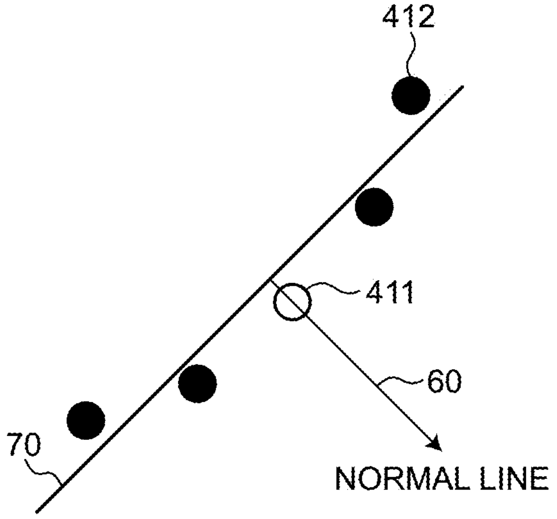
FIG. 10 is a schematic diagram for explaining a normal line estimation method by a normal line estimation unit.

FIG. 10 is a schematic diagram for explaining a normal line estimation method by the normal line estimation unit 110. In FIG. 10, a target point 411 is indicated by a white circle, and neighboring points 412 are indicated by black circles. In the example of FIG. 10, a plane 70 is formed by the target point 411 and the neighboring points 412. The normal line estimation unit 110 obtains a perpendicular line passing through the target point 411 from the plane 70, and estimates the perpendicular line as a normal line 60 of the target point 411. The normal line estimation unit 110 estimates the normal line 60 for each point while shifting the target pixel 400T by one pixel in each of the x direction and the y direction.

Figure 11:
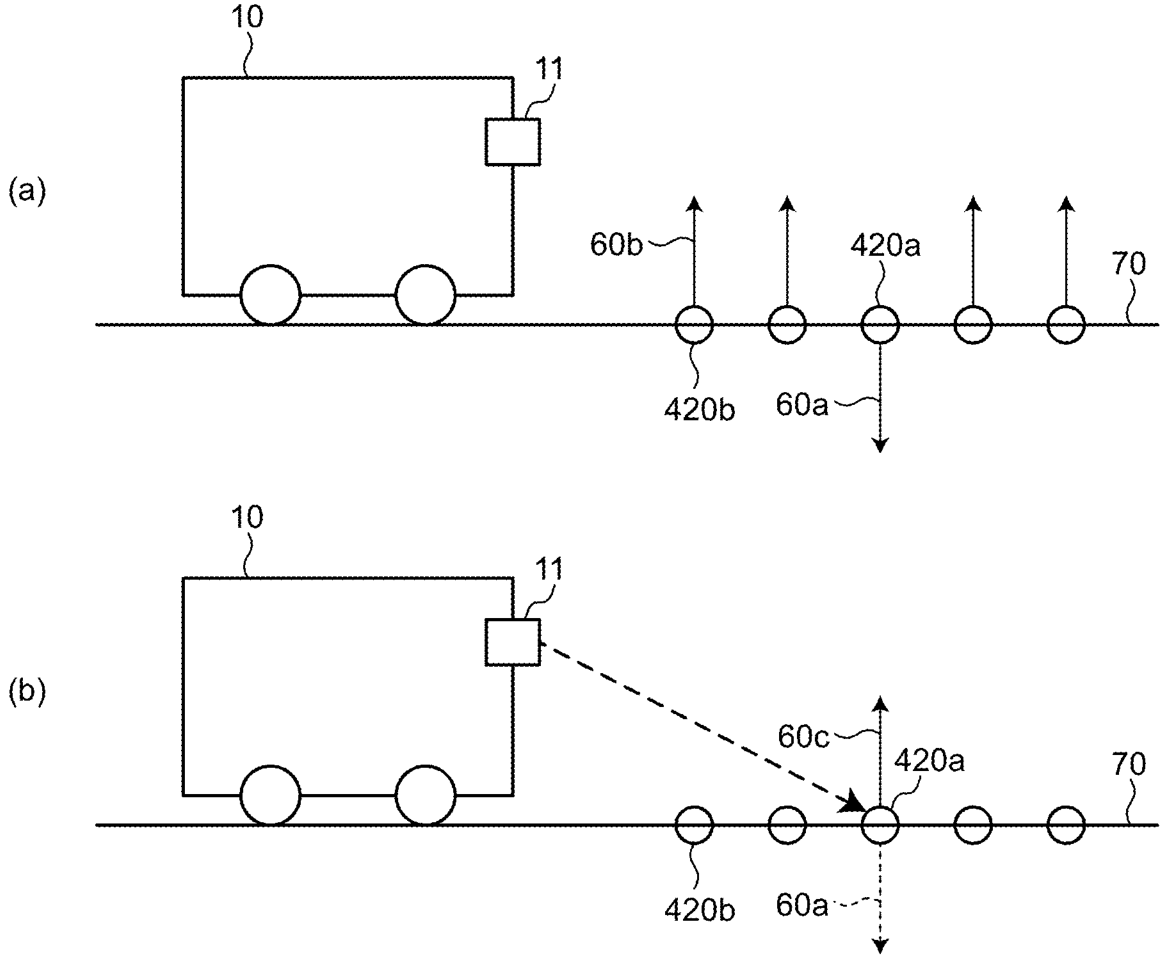
FIG. 11 is a schematic diagram for explaining correction of a normal direction by the normal line estimation unit.

Next, the normal line estimation unit 110 corrects the direction (positive or negative) of the normal line 60. FIG. 11 is a schematic diagram for explaining correction of the normal direction by the normal line estimation unit 110. There is a possibility that the directions (positive and negative) of the estimated normal line 60 are not unified. In the example of a section (a) of FIG. 11, with respect to the plane 70, normal lines **420*b* of many points 60*b* are upward (positive direction), whereas a normal line 60*a* of a point 420*a*** is downward (negative direction).

In this manner, in a state where the positive and negative normal lines 60 are mixed, the plane 70 cannot be detected as the traveling surface of the mobile body 10. Therefore, the direction of each normal line 60 is corrected so that the positive or negative direction of each normal line 60 faces the direction of the 3D distance measurement sensor 11 or the mobile body 10 with respect to the plane 70. The normal line estimation unit 110 estimates the traveling surface on which the mobile body 10 travels from a gravity direction component of the corrected normal line 60.

For example, as illustrated in a section (b) of FIG. 11, the normal line estimation unit 110 corrects the normal line 60 of the target point such that an inner product of a vector from the 3D distance measurement sensor 11 or the mobile body 10 to the target point (point **420*a* in this example) and a normal vector of the point becomes negative. In this example, the sign of the normal line 60*a* of the point 420*a* is inverted and corrected to an upward normal line 60*c*. The normal line estimation unit 110 estimates that the plane 70 is the traveling surface on the basis of the corrected normal line 60*c* and the other normal lines 60*b***.

The normal line estimation unit 110 adds normal line information indicating the normal line 60 including the corrected normal line to each point of the 3D point cloud to generate a normal line-added point cloud. The normal line estimation unit 110 outputs the generated normal line-added point cloud to the normal line information processing unit 121.

The normal line information processing unit 121 classifies the normal line-added point cloud output from the normal line estimation unit 110 into the traveling surface point cloud that is a point cloud indicating a surface on which the mobile body 10 can travel and the obstacle location point cloud that is a point cloud indicating a location that possibly becomes obstruction for the traveling of the mobile body 10.

For example, the normal line information processing unit 121 determines a point having the normal line 60 whose angle with respect to the gravity direction is a threshold (for example, ±5°) or less as a point of the traveling surface point cloud, on the basis of the normal line information of each point included in the normal line-added point cloud. On the other hand, the normal line information processing unit 121 determines a point having the normal line 60 whose angle exceeds the threshold as the obstacle location point cloud. Note that this threshold may be set on the basis of, for example, the prior information 300.

The normal line information processing unit 121 outputs the traveling surface point cloud to the sensor information integration unit 122 and outputs the obstacle location point cloud to the point cloud integration unit 124.

The sensor information integration unit 122 integrates the 2D point cloud output from the 2D distance measurement sensor 12 and the traveling surface point cloud output from the normal line information processing unit 121. The sensor information integration unit 122 outputs an integrated point cloud in which the 2D point cloud and the traveling surface point cloud are integrated to the height difference calculation unit 123.

The height difference calculation unit 123 sets a grid that divides each of the x axis and the y axis into a predetermined size for the integrated point cloud output from the sensor information integration unit 122, and obtains height information of points included in the divided areas obtained by dividing an area by the grid. The height information can be acquired, for example, on the basis of a value z at the coordinates (x,y,z) of the point. Each divided area has a maximum height max and a minimum height min based on the height information of each included point, and information indicating the presence of the normal line information of each point.

Figure 12:
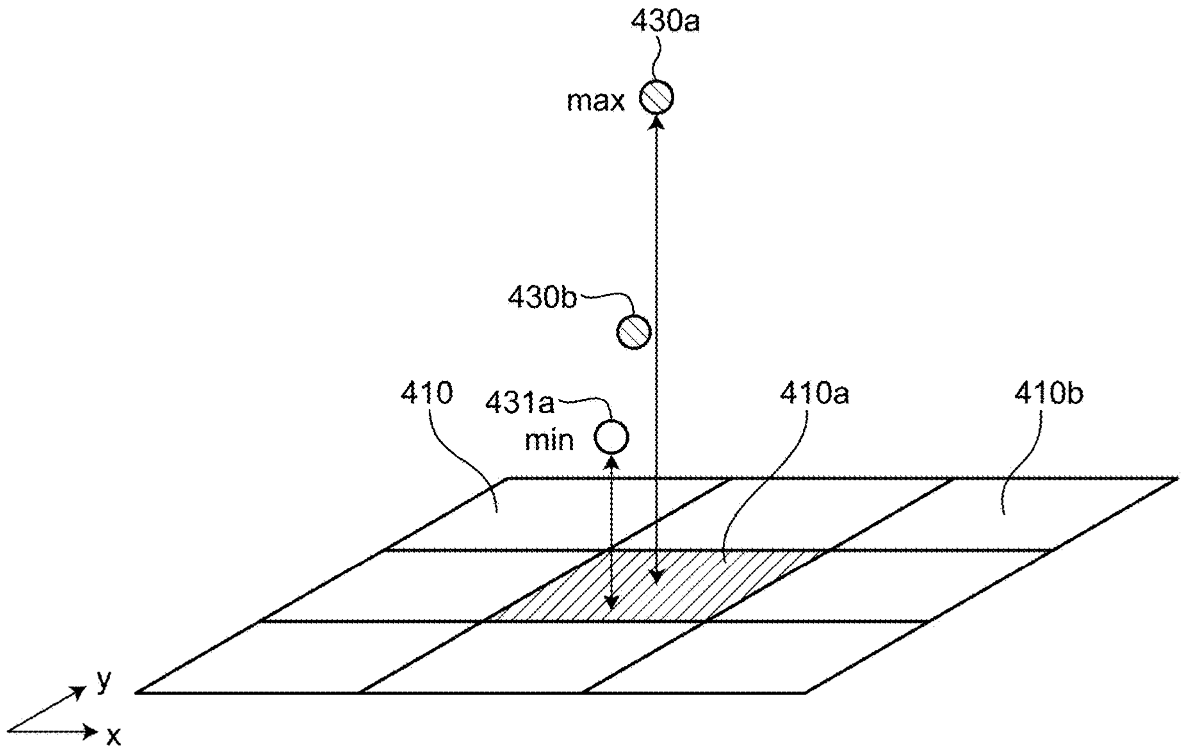
FIG. 12 is a schematic diagram for explaining a first example of height difference calculation according to the embodiment.

FIG. 12 is a schematic diagram for explaining a first example of height difference calculation according to the embodiment. The first example is an example of a case where the target divided area includes a plurality of points having the normal line information.

In FIG. 12, a divided area 410*a* includes points 430*a*, 430*b*, and 431*a* of the integrated point cloud. The points 430*a* and 430*b* are points of the 3D point cloud and have a normal line in the traveling surface direction. On the other hand, the point 431*a* is a point of the 2D point cloud and does not have a normal line. A divided area 410*b* does not include the point of the integrated point cloud.

In a case where the target divided area 410*a* has the normal line information, the height difference calculation unit 123 performs height determination for all points in the divided area 410*a*. In the example of FIG. 12, in the divided area 410*a*, the point 430*a* has the maximum height max, and the point 431*a* has the minimum height min. Note that the height of the point 431*a* constituting the 2D point cloud corresponds to, for example, the mounting height at which the 2D distance measurement sensor 12 is mounted.

The height difference calculation unit 123 calculates a height difference Δ between the maximum height max and the minimum height min, and performs threshold determination on the height difference Δ. Specifically, in a case where "max−min>threshold" and the height difference Δ exceeds the threshold, the height difference calculation unit 123 determines that the divided area is the obstacle location. On the other hand, in a case where "max−min≤threshold" and the height difference Δ is equal to or less than the threshold, the height difference calculation unit 123 determines that the divided area is the traveling surface. The threshold may be set on the basis of, for example, the prior information 300.

Figure 13:
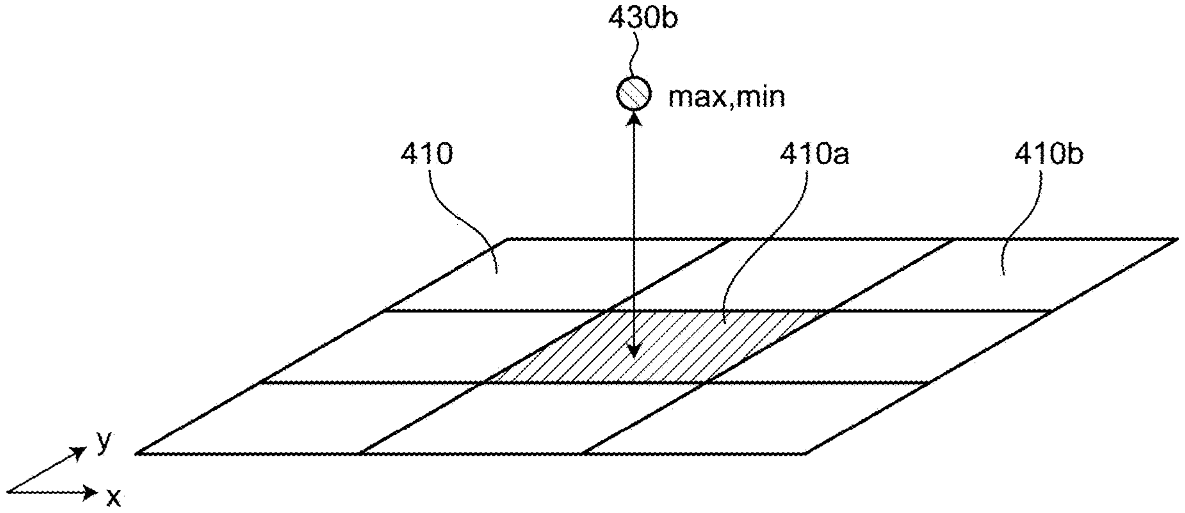
FIG. 13 is a schematic diagram for explaining a second example of the height difference calculation according to the embodiment.

FIG. 13 is a schematic diagram for explaining a second example of the height difference calculation according to the embodiment. The second example is an example of a case where the target divided area includes one point having the normal line information. In FIG. 13, the divided area 410*a* includes only the point 430*b* of the 3D point cloud in the integrated point cloud. In this case, assuming that the height of the point 430*b* is the maximum height max and is also the minimum height min, the height difference Δ becomes 0.

Figure 14:
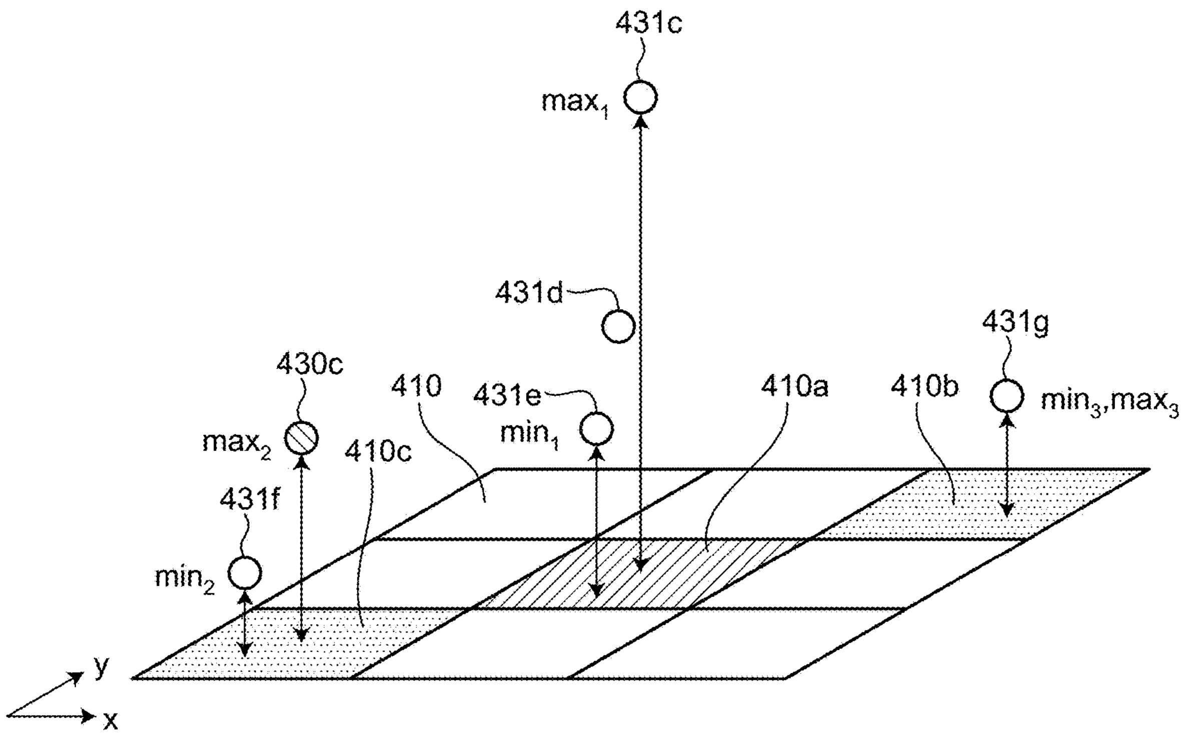
FIG. 14 is a schematic diagram for explaining a third example of the height difference calculation according to the embodiment.

FIG. 14 is a schematic diagram for explaining a third example of the height difference calculation according to the embodiment. The third example is an example of a case where the target divided area does not include a point having the normal line information.

In FIG. 14, the divided area 410*a* includes points 431*c*, 431*d*, and 431*e* of the integrated point cloud. These points 431*c*, 431*d*, and 431*e* are points of the 2D point cloud, respectively, and do not have the normal line information. In this case, the height difference calculation unit 123 calculates the height difference including the divided area around the divided area 410*a* and having the normal line information, and determines the traveling surface and the obstacle location.

In the example of FIG. 14, in the divided area 410*a*, the point 431*c* has a maximum height $max_1$, and the point 431*e* has a minimum height $min_1$. In addition, the divided area 410*b* includes a point 431*g* of the 2D point cloud of the integrated point cloud, and a divided area 410*c* includes a point 430*c* of the 3D point cloud and a point 431*f* of the 2D point cloud, the divided areas being respectively located around the divided area 410*a*. Because the divided area 410*b* includes only one point 431g, the height of the point 431g is a maximum height $max_3$ and a minimum height $min_3$. Further, in the divided area 410*c*, the point 430*c* has a maximum height $max_2$, and the point 431*f* has a minimum height $min_2$. The relationship between the heights of the points is, for example, $max_1 > max_2 > min_1 > max_3\ (=min_3) > min_2$.

In this case, the height difference calculation unit 123 calculates the height difference Δ on the basis of the height information of the points 431*c* and 431*e* included in the target divided area 410*a* and the points 431g, 430*c*, and 431*f* included in the divided areas 410*b* and 410*c*, the divided areas 410*b* and 410*c* being located around the divided area 410*a* and respectively including the points of the integrated point cloud. In the example of FIG. 14, the height difference calculation unit 123 calculates the difference between the maximum height $max_1$ of the point 431*c* having the maximum height and the minimum height $min_2$ of the point 431*f* having the minimum height as the height difference Δ. Because the determination based on the height difference Δ by the height difference calculation unit 123 is similar to that in the first example described above, the description thereof will be omitted here.

Figure 15:
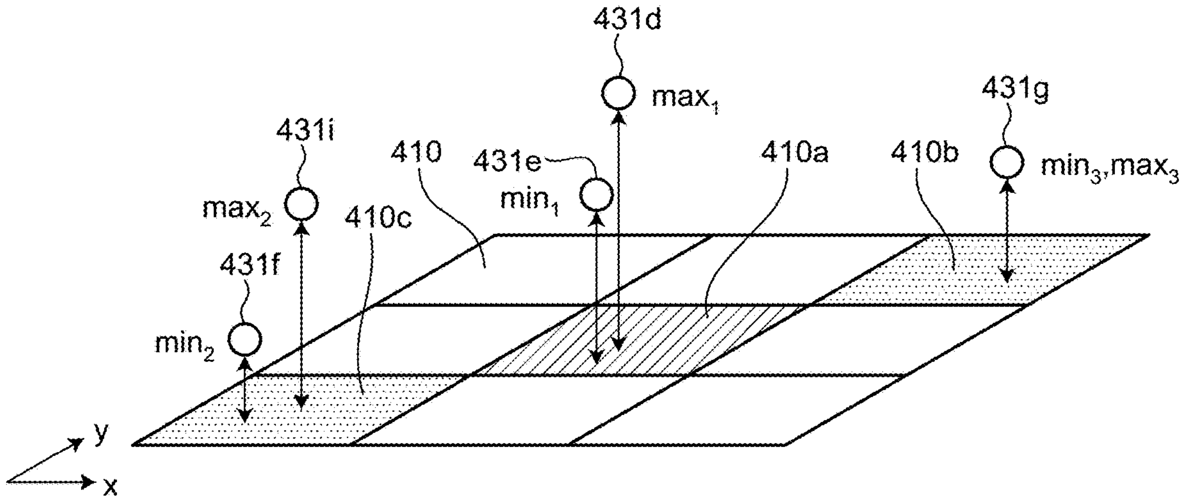
FIG. 15 is a schematic diagram for explaining a fourth example of the height difference calculation according to the embodiment.

FIG. 15 is a schematic diagram for explaining a fourth example of the height difference calculation according to the embodiment. This fourth example is an example of a case where the target divided area does not include a point having the normal line information, and the divided area around the target divided area also does not include a point having the normal line information.

In FIG. 15, the divided area 410*a* includes the points 431*d* and 431*e* of the integrated point cloud. These points 431*d* and 431*e* are points of the 2D point cloud, respectively, and do not have the normal line information. In addition, the divided areas 410*b* and 410*c* around the divided area 410*a* include the point 431*g* of the integrated point cloud and the point 431*f* and a point 431*i* of the integrated point cloud, respectively. These points 431*g*, 431*f*, and 431*i* are also points of the 2D point cloud, respectively, and do not have the normal line information.

In the example of FIG. 15, in the divided area 410*a*, the point 431*d* has the maximum height $max_1$, and the point 431*e* has the minimum height $min_1$. Further, the divided area 410*b* includes only one point 431*g*, and the height of the point 431*g* is the maximum height $max_3$ and the minimum height $min_3$. Furthermore, in the divided area 410*c*, the point 431*i* has the maximum height $max_2$, and the point 431*f* has the minimum height $min_2$. The relationship between the heights of the points is, for example, $max_1>max_2>max_3$ $(=min_3)>min_1>min_2$.

In this case, the height difference calculation unit 123 calculates the height difference Δ on the basis of the height information of the points 431*d* and 431*e* included in the target divided area 410*a* and the points 431*g*, 431*i*, and 431*f* included in the divided areas 410*b* and 410*c*, the divided areas 410*b* and 410*c* being located around the divided area 410*a* and respectively including the points of the integrated point cloud. In the example of FIG. 15, the height difference calculation unit 123 calculates the difference between the maximum height $max_1$ of the point 431*d* having the maximum height and the minimum height $min_2$ of the point 431*f* having the minimum height as the height difference Δ. Because the determination based on the height difference Δ by the height difference calculation unit 123 is similar to that in the first example described above, the description thereof will be omitted here.

As described above, for every divided area 410, the height difference calculation unit 123 determines whether the divided area 410 is the obstacle location or the traveling surface. The height difference calculation unit 123 outputs the point cloud constituted of the points included in each of the divided areas 410 determined as the obstacle location to the point cloud integration unit 124 as the obstacle location point cloud.

The point cloud integration unit 124 integrates the obstacle location point cloud output from the normal line information processing unit 121 and the obstacle location point cloud output from the height difference calculation unit 123. The point cloud integration unit 124 outputs the integrated obstacle location point cloud to the map creation unit 130. The map creation unit 130 creates the obstacle location map based on, for example, the two-dimensional information, on the basis of the integrated obstacle location point cloud output from the point cloud integration unit 124.

Figure 16:
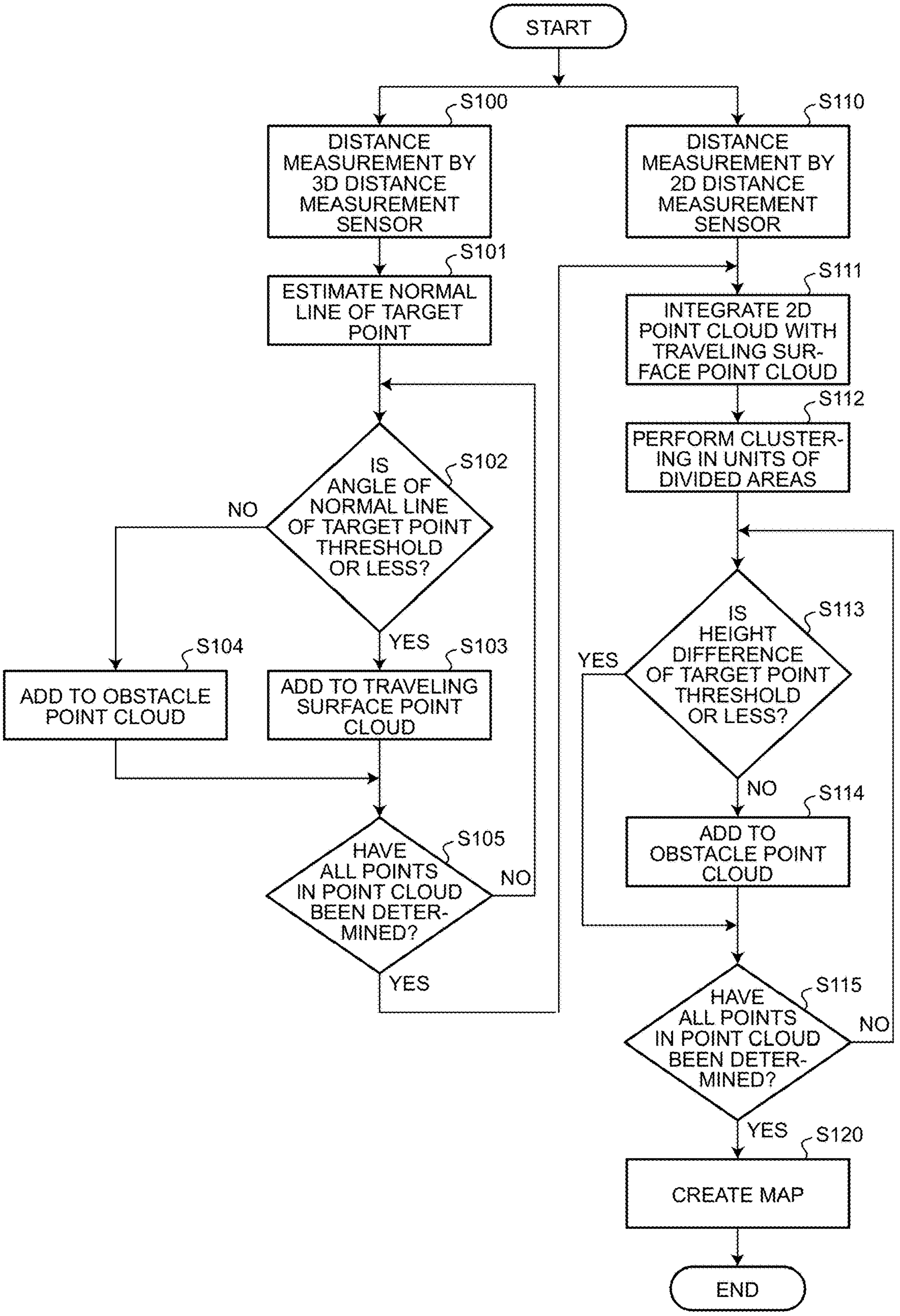
FIG. 16 is a flowchart illustrating an example of creation processing of an obstacle location map according to the embodiment.

FIG. 16 is a flowchart illustrating an example of creation processing of the obstacle location map according to the embodiment. In Step S100, distance measurement is performed by the 3D distance measurement sensor 11, and the 3D point cloud is output from the 3D distance measurement sensor 11 to the normal line estimation unit 110. Further, in Step S110, distance measurement is performed by the 2D distance measurement sensor 12, and the 2D point cloud is output from the 2D distance measurement sensor 12 to the sensor information integration unit 122. The sensor information integration unit 122 stores the 2D point cloud output from the 2D distance measurement sensor 12 in a memory (for example, the RAM 1003)

Note that the distance measurement by the 3D distance measurement sensor 11 in Step S100 and the distance measurement by the 2D distance measurement sensor 12 in Step S110 are preferably performed in, for example, synchronization. In this case, for example, in a case where the traveling of the mobile body 10 on which the 3D distance measurement sensor 11 and the 2D distance measurement sensor 12 are mounted is in a stopped state, the distance measurement by the 3D distance measurement sensor 11 and the distance measurement by the 2D distance measurement sensor 12 are not always necessarily executed simultaneously.

In Step S101, in the map creation device 100, the normal line estimation unit 110 estimates the normal line for each point included in the 3D point cloud output from the 3D distance measurement sensor 11 as described by using FIGS. 9 and 10.

In the next Step S102, the normal line information processing unit 121 determines whether or not the angle of the normal line of the target point among the points included in the 3D point cloud is equal to or less than the threshold on the basis of the normal line information of the normal line estimated by the normal line estimation unit 110. That is, in Step S102, the inclination is determined.

In a case where the normal line information processing unit 121 determines that the angle of the normal line of the target point is equal to or less than the threshold (Step S102, "Yes"), the processing proceeds to Step S103. In Step S103, the normal line information processing unit 121 determines that the target point is a point on the traveling surface, and adds the target point to the traveling surface point cloud.

On the other hand, in a case where the normal line information processing unit 121 determines that the angle of the normal line of the target point exceeds the threshold (Step S102, "No"), the processing proceeds to Step S104. In Step S104, the normal line information processing unit 121 determines that the target point is a point on the obstacle location, and adds the target point to the obstacle location point cloud.

After the processing of Step S103 or Step S104, the normal line information processing unit 121 proceeds the processing to Step S105, and determines whether or not the determination has been made for all the points included in the 3D point cloud acquired in Step S100. In a case where it is determined that there is a point that has not been determined yet (Step S105, "No"), the normal line information processing unit 121 returns the processing to Step S102, and executes the processing in and after Step S102 with the unprocessed next point in the 3D point cloud as the target point.

On the other hand, in a case where the normal line information processing unit 121 determines in Step S105 that the determination has been made for all the points (Step S105, "Yes"), the processing proceeds to Step S111. In Step S111, the sensor information integration unit 122 integrates the 2D point cloud output from the 2D distance measurement sensor 12 and the traveling surface point cloud created in Step S103 to generate the integrated point cloud. In the next Step S112, the sensor information integration unit 122 performs clustering on the integrated point cloud in units of the divided areas 410, and determines in which divided area 410 each point included in the integrated point cloud is included.

In the next Step S113, the height difference calculation unit 123 determines whether or not the height difference Δ of the target point in the point cloud included in the target divided area 410 is equal to or less than the threshold. That is, in Step S113, the step is determined. In a case where the height difference calculation unit 123 determines that the height difference Δ exceeds the threshold (Step S113, "No"), the processing proceeds to Step S114. In Step S114, the height difference calculation unit 123 adds the target point to the obstacle location point cloud. After the processing of Step S114, the processing proceeds to Step S115.

On the other hand, in a case where the height difference calculation unit 123 determines that the height difference Δ is equal to or less than the threshold in Step S113, Step S114 is skipped and the processing proceeds to Step S115.

In Step S115, the height difference calculation unit 123 determines whether or not the determination has been made for all the points included in the integrated point cloud. In a case where it is determined that there is a point that has not been determined yet (Step S115, "No"), the height difference calculation unit 123 returns the processing to Step S113, and executes the processing in and after Step S113 with the unprocessed next point in the integrated point cloud as the target point.

On the other hand, in a case where the height difference calculation unit 123 determines that the determination has been made for all the points in S115 (Step S115, "Yes"), the processing proceeds to Step S120. At this time, the height difference calculation unit 123 outputs the obstacle location point cloud generated in Step S114 to the point cloud integration unit 124. The point cloud integration unit 124 integrates the obstacle location point cloud output from the height difference calculation unit 123 and the obstacle location point cloud output from the normal line information processing unit 121, and outputs the integrated obstacle location point cloud to the map creation unit 130.

In Step S120, the map creation unit 130 creates the obstacle location map on the basis of the point cloud output from the point cloud integration unit 124. The map creation unit 130 outputs the created obstacle location map to the travel control system 200.

The obstacle location map created by the map creation unit 130 will be described with reference to FIGS. 17 to 20.

Figure 17:
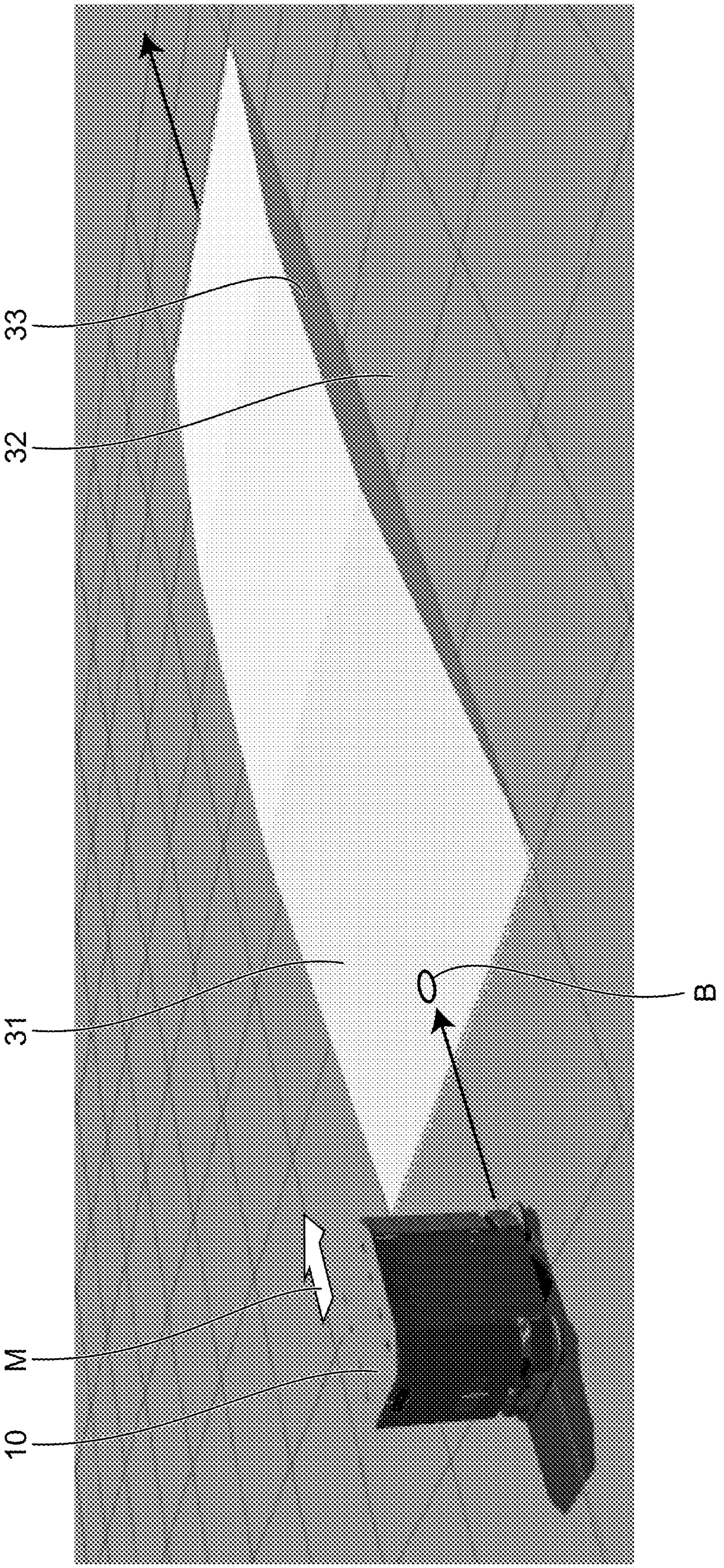
FIG. 17 is a schematic diagram for explaining the obstacle location map.

As a first example, a case where there is a slope that can be climbed in the traveling direction of the mobile body 10 will be described. As illustrated in FIG. 17, it is assumed that there is a slope 31 in the traveling direction of the mobile body 10 traveling in the direction indicated by an arrow M. In the slope 31, the right and left sides in the traveling direction form a depression 32, and the side surface forms a step 33. In addition, it is assumed that a gradient of the slope 31 is an angle smaller than an angle at which the mobile body 10 can climb, and the step 33 has a height at which the mobile body 10 cannot travel.

Figure 18:
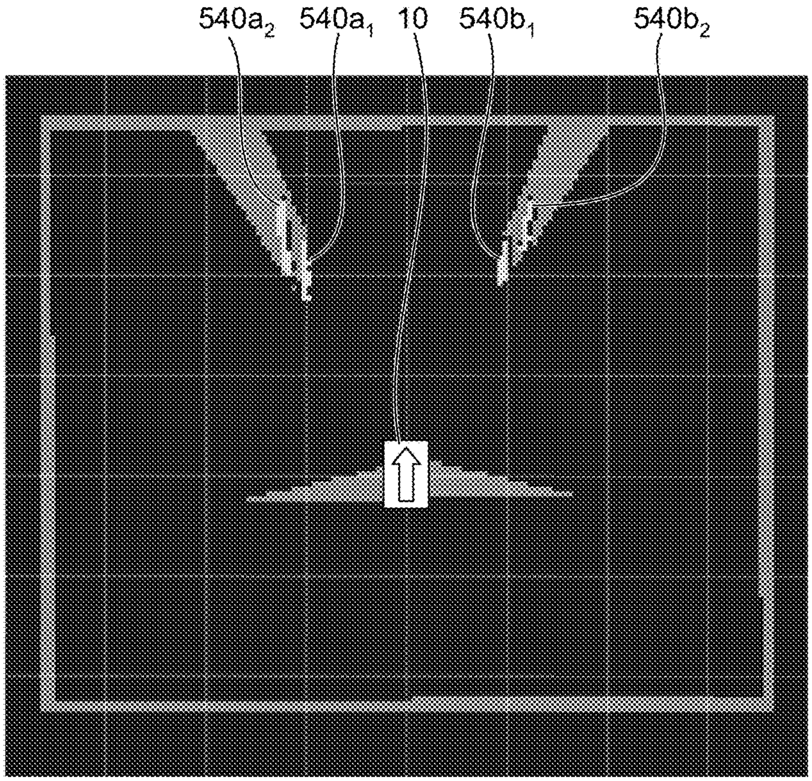
FIG. 18 is a schematic diagram for explaining the obstacle location map.
Figure 18:
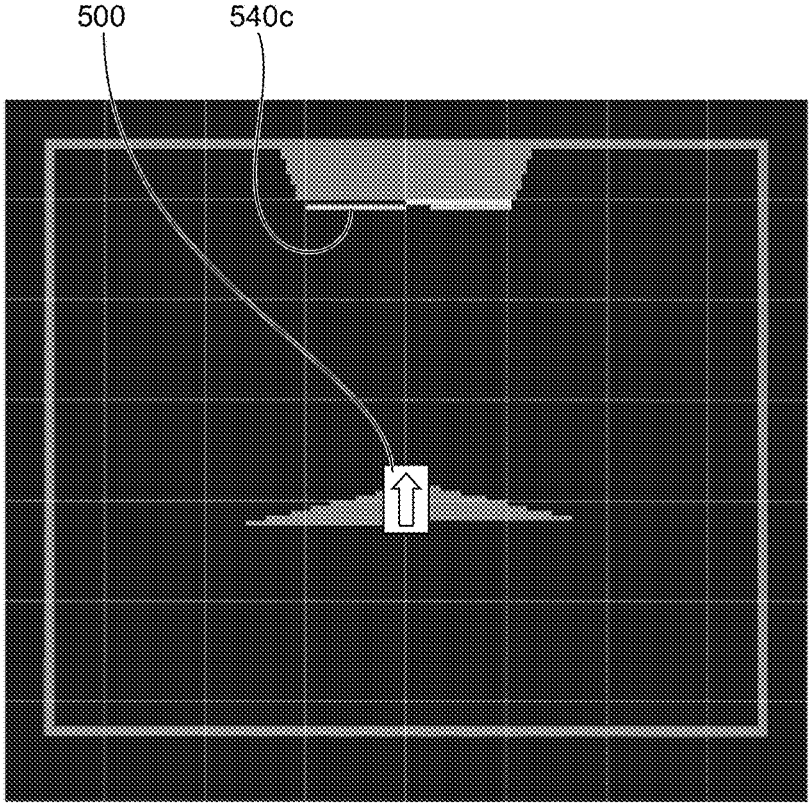

FIG. 18 illustrates a comparison between the obstacle location map created by the map creation device 100 according to the embodiment and the obstacle location map created by the existing technique, with respect to the environment illustrated in FIG. 17. In FIG. 18, a section (a) illustrates an example of the obstacle location map created by using the map creation device 100 according to the embodiment, and a section (b) illustrates an example of the obstacle location map created by the existing technique. As the existing technique, the mobile body 500 in which the 2D distance measurement sensor is mounted at a predetermined mounting height is assumed.

In the map creation device 100 according to the embodiment, because the obstacle location map is created by using both the 3D distance measurement sensor 11 and the 2D distance measurement sensor 12, the slope 31 is not detected as an obstacle location as illustrated in the section (a). Meanwhile, portions of the right and left steps 33 in the slope 31 are detected as obstacle locations 540$a_1$ and 540$a_2$ and obstacle locations 540$b_1$ and 540$b_2$, and are expressed on the map. With this map, the mobile body 10 can be controlled so as to climb the slope 31.

On the other hand, in the existing technique, the mobile body 500 detects an obstacle location by using the 2D distance measurement sensor mounted at a predetermined height. Therefore, the obstacle location is detected on the basis of the height (for example, the height of a position B in FIG. 17) corresponding to the mounting height of the 2D distance measurement sensor in the slope 31. In the example of the section (b) in FIG. 18, a portion of the slope 31 corresponding to the height of the position B in FIG. 17 is detected as an obstacle location 540$c$. Therefore, the mobile body 500 is controlled not to climb the slope 31 even though the gradient of the slope 31 is an angle at which the mobile body can climb.

Figure 19:
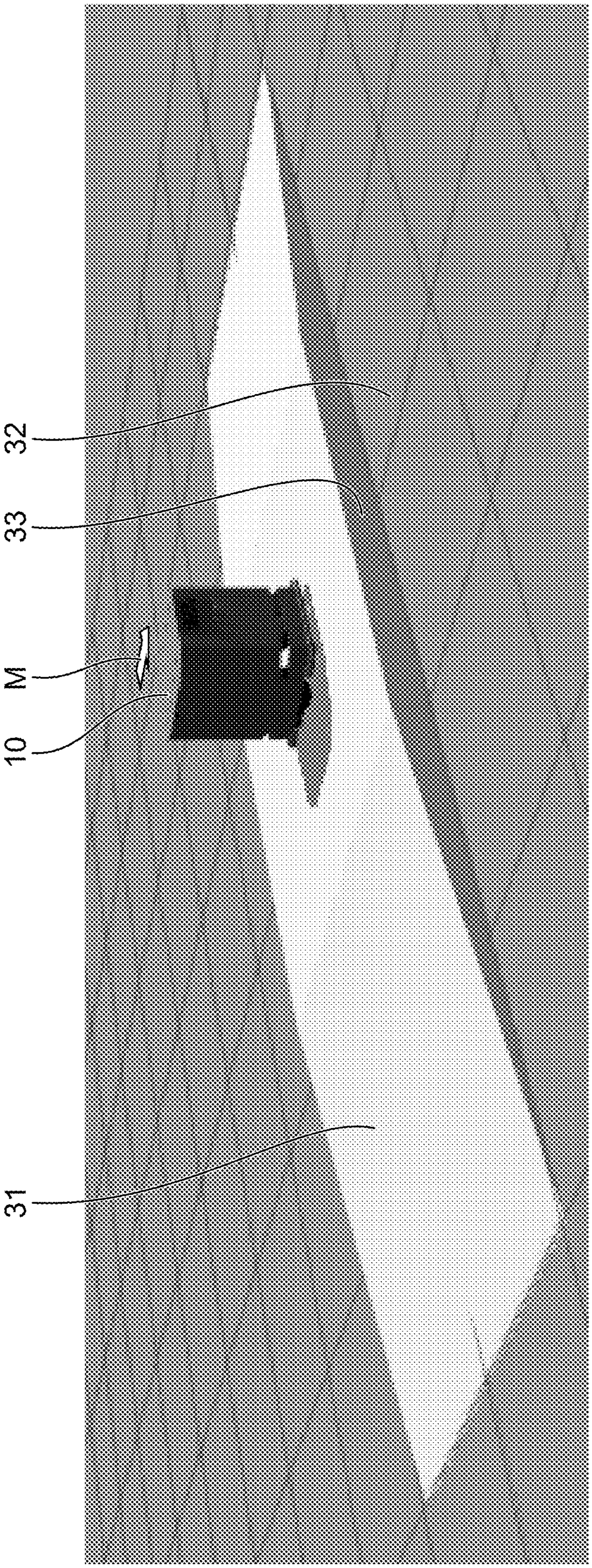
FIG. 19 is a schematic diagram for explaining the obstacle location map.

As a second example, a case where there is a step and a depression in the traveling direction of the mobile body 10 will be described. As illustrated in FIG. 19, it is assumed that the mobile body 10 is at a position has reached at the top of the slope 31 and is about to travel in the direction of the step 33 as indicated by an arrow M in the drawing. The slope 31 and the step 33 are similar to those in FIG. 17.

Figure 20:
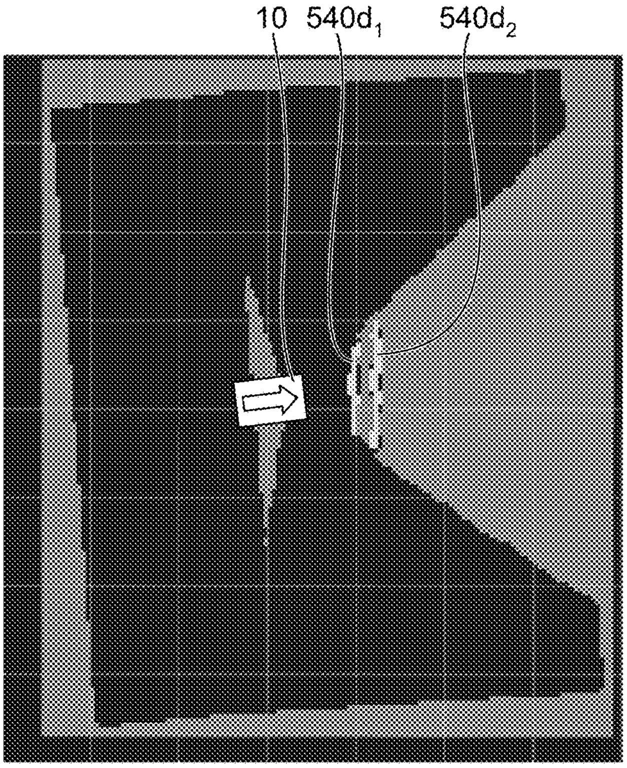
FIG. 20 is a schematic diagram for explaining the obstacle location map.
Figure 20:
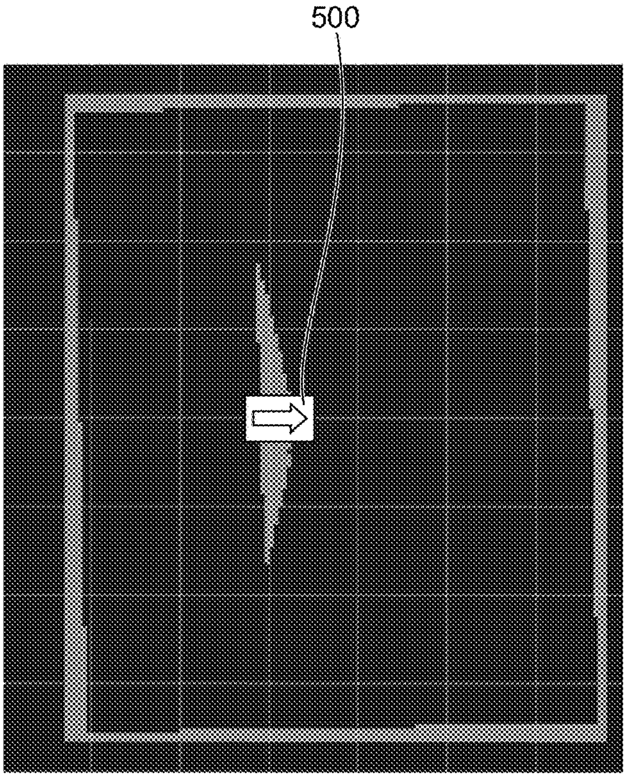

FIG. 20 illustrates a comparison between the obstacle location map created by the map creation device 100 according to the embodiment and the obstacle location map created by the existing technique, with respect to the environment illustrated in FIG. 19. In FIG. 20, a section (a) illustrates an example of the obstacle location map created by using the map creation device 100 according to the embodiment, and a section (b) illustrates an example of the obstacle location map created by the existing technique. As the existing technique, the mobile body 500 in which the 2D distance measurement sensor is mounted at a predetermined mounting height is assumed.

In the map creation device 100 according to the embodiment, because the obstacle location map is created by using both the 3D distance measurement sensor 11 and the 2D distance measurement sensor 12, the depression 32 can be detected. With this configuration, as illustrated in the section (a), the step 33 at the boundary portion between the current position of the mobile body 10 and the depression 32 is detected as the obstacle locations 540$d_1$ and 540$d_2$ and is expressed on the map. Therefore, the mobile body 10 can be controlled not to travel in the direction indicated by the arrow M on the basis of this map.

On the other hand, in the existing technique, the mobile body 500 detects an obstacle location by using the 2D distance measurement sensor mounted at a predetermined height. Therefore, the depression 32 cannot be detected, and the step 33 is not detected as the obstacle location as illustrated in the section (b) of FIG. 20. Therefore, the mobile body 500 is controlled to travel in the direction of the step 33 even though the step 33 cannot ne traveled.

As described above, the map creation device 100 according to the embodiment integrates the 3D point cloud acquired by the 3D distance measurement sensor and the 2D point cloud acquired by the 2D distance measurement sensor to create the obstacle location map without accumulating three-dimensional information. Therefore, by applying the map creation device 100 according to the embodiment, the non-planar environment such as the slope 31 and the depression 32 can be detected at low cost.

3. Other Embodiments

Next, other embodiments of the present disclosure will be described. The other embodiments include an example in which the map creation device 100 according to the above-described embodiment is applied to a vehicle control system that controls traveling of a vehicle.

Figure 21:
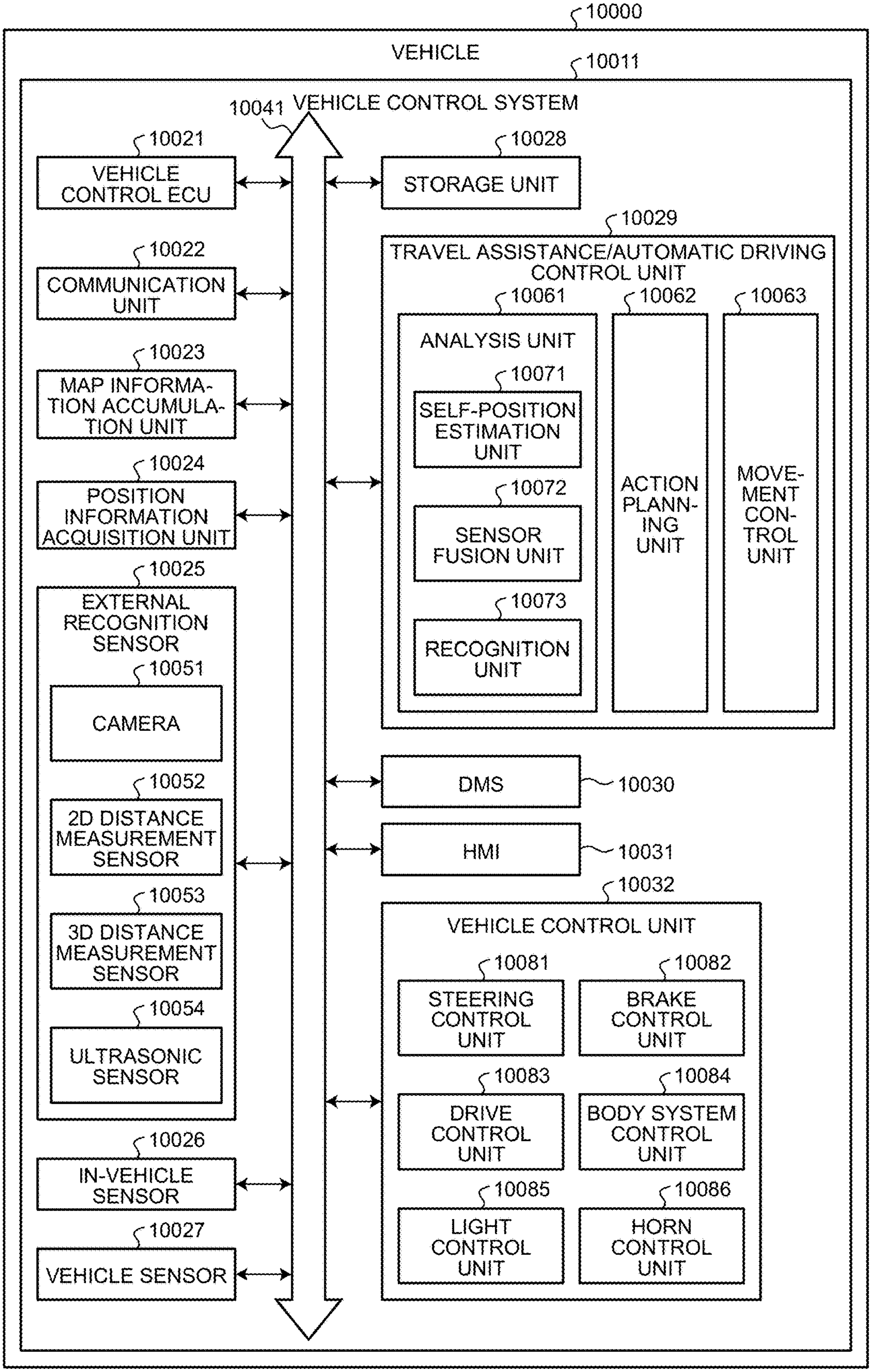
FIG. 21 is a block diagram illustrating a configuration example of a vehicle control system.

FIG. 21 is a block diagram illustrating a configuration example of a vehicle control system 10011 which is an example of a mobile device control system to which the present technology is applied.

The vehicle control system 10011 is provided in a vehicle 10000 and performs processing related to travel assistance and automatic driving of the vehicle 10000.

The vehicle control system 10011 includes a vehicle control Electronic Control Unit (ECU) 10021, a communication unit 10022, a map information accumulation unit 10023, a position information acquisition unit 10024, an external recognition sensor 10025, an in-vehicle sensor 10026, a vehicle sensor 10027, a storage unit 10028, a travel assistance/automatic driving control unit 10029, a Driver Monitoring System (DMS) 10030, a Human Machine Interface (HMI) 10031, and a vehicle control unit 10032.

The vehicle control ECU 10021, the communication unit 10022, the map information accumulation unit 10023, the position information acquisition unit 10024, the external recognition sensor 10025, the in-vehicle sensor 10026, the vehicle sensor 10027, the storage unit 10028, the travel assistance/automatic driving control unit 10029, the Driver Monitoring System (DMS) 10030, the HMI 10031, and the vehicle control unit 10032 are communicably connected to each other via a communication network 10041. The communication network 10041 includes, for example, an in-vehicle communication network, a bus, or the like conforming to a digital bidirectional communication standard such as a Controller Area Network (CAN), a Local Interconnect Network (LIN), a Local Area Network (LAN), FlexRay (registered trademark), or Ethernet (registered trademark). The communication network 10041 may be selectively used depending on a type of data to be transmitted. For example, the CAN may be applied to data related to vehicle control, and the Ethernet may be applied to large-capacity data. Note that, in some cases, each unit of the vehicle control system 10011 is directly connected not via the communication network 10041 but by using wireless communication that assumes communication at a relatively short distance, such as Near Field Communication (NFC) or Bluetooth (registered trademark).

Note that, hereinafter, in a case where each unit of the vehicle control system 10011 performs communication via the communication network 10041, description of the communication network 10041 will be omitted. For example, in a case where the vehicle control ECU 10021 and the communication unit 10022 perform communication via the communication network 10041, it is simply described that the vehicle control ECU 10021 and the communication unit 10022 perform communication.

The vehicle control ECU 10021 includes, for example, various processors such as a Central Processing Unit (CPU) and a Micro Processing Unit (MPU). The vehicle control ECU 10021 controls the entire or partial function of the vehicle control system 10011.

The communication unit 10022 communicates with various devices inside and outside the vehicle, other vehicles, servers, base stations, and the like, and transmits and receives various types of data. At this time, the communication unit 10022 can perform communication using a plurality of communication schemes.

The communication with the outside of the vehicle executable by the communication unit 10022 will be schematically described. The communication unit 10022 communicates with a server (hereinafter, referred to as an external server) or the like that is present on an external network via a base station or an access point by a wireless communication method such as 5th Generation mobile communication system (5G), Long Term Evolution (LTE), or Dedicated Short Range Communications (DSRC). The external network with which the communication unit 10022 performs communication is, for example, the Internet, a cloud network, a company specific network, or the like. The communication method performed by the communication unit 10022 with respect to the external network is not particularly limited as long as the method is a wireless communication method that can perform digital bidirectional communication at a communication speed equal to or higher than a predetermined speed and at a distance equal to or longer than a predetermined distance.

Furthermore, for example, the communication unit 10022 can communicate with a terminal that is present in the vicinity of an own vehicle by using a Peer To Peer (P2P) technology. The terminal present in the vicinity of the own vehicle is, for example, a terminal worn by a mobile body moving at a relatively low speed such as a pedestrian or a bicycle, a terminal installed in a store or the like with a position fixed, or a Machine Type Communication (MTC) terminal. Furthermore, the communication unit 10022 can also perform V2X communication. The V2X communication refers to, for example, communication between the own vehicle and another vehicle, such as Vehicle to Vehicle communication with another vehicle, Vehicle to Infrastructure communication with a roadside device or the like, Vehicle to Home communication, and Vehicle to Pedestrian communication with a terminal or the like carried by a pedestrian.

For example, the communication unit 10022 can receive a program for updating software for controlling the operation of the vehicle control system 10011 from the outside (Over The Air). The communication unit 10022 can further receive map information, traffic information, information around the vehicle 10000, and the like from the outside. Furthermore, for example, the communication unit 10022 can transmit information regarding the vehicle 10000, information around the vehicle 10000, and the like to the outside. Examples of the information on the vehicle 10000 transmitted to the outside by the communication unit 10022 include data indicating a state of the vehicle 10000, a recognition result by a recognition unit 10073, and the like. Furthermore, for example, the communication unit 10022 performs communication corresponding to a vehicle emergency call system such as an eCall.

For example, the communication unit 10022 receives an electromagnetic wave transmitted by Vehicle Information and Communication System (VICS) (registered trademark) using such as a radio wave beacon, an optical beacon, or FM multiplex broadcasting.

The communication with the inside of the vehicle executable by the communication unit 10022 will be schematically described. The communication unit 10022 can communicate with each in-vehicle device by using, for example, wireless communication. The communication unit 10022 can perform wireless communication with the in-vehicle device by a communication method that can perform digital bidirectional communication at a predetermined communication speed or higher by wireless communication, such as wireless LAN, Bluetooth, NFC, or Wireless USB (WUSB). Not limited to this, the communication unit 10022 can communicate with each in-vehicle device by using wired communication. For example, the communication unit 10022 can communicate with each in-vehicle device by wired communication via a cable connected to a not-illustrated connection terminal. The communication unit 10022 can communicate with each in-vehicle device by a communication method that can perform digital bidirectional communication at a predetermined communication speed or higher by wired communication, such as Universal Serial Bus (USB), High-Definition Multimedia Interface (HDMI) (registered trademark), or Mobile High-definition Link (MHL).

Here, the in-vehicle device refers to, for example, a device that is not connected to the communication network 10041 in the vehicle. As the in-vehicle device, for example, a mobile device or a wearable device carried by a passenger such as a driver, an information device brought into the vehicle and temporarily installed, or the like is assumed.

The map information accumulation unit 10023 accumulates one or both of a map acquired from the outside and a map created by the vehicle 10000. For example, the map information accumulation unit 10023 accumulates a three-dimensional high-precision map, a global map having lower accuracy than the high-precision map and covering a wide area, and the like.

The high-precision map is, for example, a dynamic map, a point cloud map, a vector map, or the like. The dynamic map is, for example, a map including four layers of dynamic information, semi-dynamic information, semi-static information, and static information, and is provided to the vehicle 10000 from an external server or the like. The point cloud map is a map including point clouds (point cloud data). The vector map is, for example, a map in which traffic information such as a position of a lane and a traffic light is associated with a point cloud map and adapted to Advanced Driver Assistance System (ADAS) or Autonomous Driving (AD).

The point cloud map and the vector map may be provided from, for example, an external server or the like, or may be created by the vehicle 10000 as a map for performing matching with a local map to be described later on the basis of a sensing result by a camera 10051, a 2D distance measurement sensor 10052, a 3D distance measurement sensor 10053, or the like, and may be accumulated in the map information accumulation unit 10023. Furthermore, in a case where a high-precision map is provided from the external server or the like, map data of, for example, several hundred meters square regarding a planned path on which the vehicle 10000 is about to travel is acquired from the external server or the like in order to reduce the communication capacity.

The position information acquisition unit 10024 receives a Global Navigation Satellite System (GNSS) signal from a GNSS satellite, and acquires position information of the vehicle 10000. The acquired position information is supplied to the travel assistance/automatic driving control unit 10029. Note that the position information acquisition unit 10024 is not limited to the method using the GNSS signal, and may acquire the position information by using, for example, a beacon.

The external recognition sensor 10025 includes various sensors used for recognizing a situation outside the vehicle 10000, and supplies sensor data from each sensor to each unit of the vehicle control system 10011. The type and the number of sensors included in the external recognition sensor 10025 are optional.

For example, the external recognition sensor 10025 includes the camera 10051, the 2D distance measurement sensor 10052, the 3D distance measurement sensor 10053, and an ultrasonic sensor 10054. Not limited to this, one or both of the camera 10051 and the ultrasonic sensor 10054 can be omitted from the external recognition sensor 10025. The number of the cameras 10051, the 2D distance measurement sensors 10052, the 3D distance measurement sensors 10053, and the ultrasonic sensors 10054 is not particularly limited as long as the number of the sensors is practically installable in the vehicle 10000. Furthermore, the type of sensor included in the external recognition sensor 10025 is not limited to this example, and the external recognition sensor 10025 may include another type of sensor. An example of the sensing area of each sensor included in the external recognition sensor 10025 will be described later.

Note that an imaging method of the camera 10051 is not particularly limited. For example, cameras of various imaging methods such as a Time Of Flight (ToF) camera, a stereo camera, a monocular camera, and an infrared camera, which are imaging methods that can perform distance measurement, can be applied to the camera 10051 as necessary. Not limited to this, the camera 10051 may simply acquire a captured image regardless of distance measurement.

Furthermore, for example, the external recognition sensor 10025 can include an environment sensor for detecting the environment for the vehicle 10000. The environment sensor is a sensor for detecting the environment such as climate, weather, and brightness, and can include various sensors such as a raindrop sensor, a fog sensor, a sunshine sensor, a snow sensor, and an illuminance sensor.

Furthermore, for example, the external recognition sensor 10025 includes a microphone used for detecting sound around the vehicle 10000, a position of a sound source, and the like.

The in-vehicle sensor 10026 includes various sensors used for detecting in-vehicle information, and supplies sensor data from each sensor to each unit of the vehicle control system 10011. The type and number of various sensors included in the in-vehicle sensor 10026 are not particularly limited as long as the type and the number of the sensors can be practically installed in the vehicle 10000.

For example, the in-vehicle sensor 10026 can include one or more sensors among a camera, a radar, a seating sensor, a steering wheel sensor, a microphone, and a biological sensor. As the camera included in the in-vehicle sensor 10026, for example, cameras of various photographing methods that can perform distance measurement can be used, such as a ToF camera, a stereo camera, a monocular camera, and an infrared camera. Not limited to this, the camera included in the in-vehicle sensor 10026 may simply acquire a captured image regardless of distance measurement. The biological sensor included in the in-vehicle sensor 10026 is provided, for example, on a seat, a steering wheel, or the like, and detects various types of biological information of an occupant such as the driver.

The vehicle sensor 10027 includes various sensors used for detecting a state of the vehicle 10000, and supplies sensor data from each sensor to each unit of the vehicle control system 10011. The type and number of various sensors included in the vehicle sensor 10027 are not particularly limited as long as the type and the number of the sensors can be practically installed in the vehicle 10000.

For example, the vehicle sensor 10027 includes a speed sensor, an acceleration sensor, an angular velocity sensor (gyro sensor), and an Inertial Measurement Unit (IMU) integrating these sensors. For example, the vehicle sensor 10027 includes a steering angle sensor that detects the steering angle of a steering wheel, a yaw rate sensor, an accelerator sensor that detects the operation amount of an accelerator pedal, and a brake sensor that detects the operation amount of a brake pedal. For example, the vehicle sensor 10027 includes a rotation sensor that detects the rotation speed of an engine or a motor, an air pressure sensor that detects the air pressure of a tire, a slip ratio sensor that detects the slip ratio of a tire, and a wheel speed sensor that detects the rotation speed of the wheel. For example, the vehicle sensor 10027 includes a battery sensor that detects the remaining amount and the temperature of a battery, and an impact sensor that detects the external impact.

The storage unit 10028 includes at least one of a non-volatile storage medium and a volatile storage medium, and stores data and a program. The storage unit 10028 is used as, for example, an Electrically Erasable Programmable Read Only Memory (EEPROM) and a Random Access Memory (RAM), and a magnetic storage device such as a Hard Disc Drive (HDD), a semiconductor storage device, an optical storage device, and a magneto-optical storage device can be applied as the storage medium. The storage unit 10028 stores various types of programs and data used by each unit of the vehicle control system 10011. For example, the storage unit 10028 includes an Event Data Recorder (EDR) and a Data Storage System for Automated Driving (DSSAD), and stores information of the vehicle 10000 before and after an event such as an accident and information acquired by the in-vehicle sensor 10026.

The travel assistance/automatic driving control unit 10029 controls travel assistance and automatic driving of the vehicle 10000. For example, the travel assistance/automatic driving control unit 10029 includes an analysis unit 10061, an action planning unit 10062, and a movement control unit 10063.

The analysis unit 10061 performs analysis processing of the vehicle 10000 and the surrounding situation. The analysis unit 10061 includes a self-position estimation unit 10071, a sensor fusion unit 10072, and the recognition unit 10073.

The self-position estimation unit 10071 estimates the self-position of the vehicle 10000 on the basis of sensor data from the external recognition sensor 10025 and the high-precision map accumulated in the map information accumulation unit 10023. For example, the self-position estimation unit 10071 generates a local map on the basis of the sensor data from the external recognition sensor 10025, and estimates the self-position of the vehicle 10000 by matching the local map with the high-precision map. The position of the vehicle 10000 is based on, for example, the center of the rear wheel pair axle.

The local map is, for example, a three-dimensional high-precision map created by using a technique such as Simultaneous Localization and Mapping (SLAM), an occupancy grid map, or the like. The three-dimensional high-precision map is, for example, the above-described point cloud map or the like. The occupancy grid map is a map that divides a three-dimensional or two-dimensional space around the vehicle 10000 into grids (lattices) of a predetermined size and indicates an occupancy state of an object in units of grids. The occupancy state of the object is indicated by, for example, the presence or the existence probability of the object. The local map is also used for, for example, detection processing and recognition processing of a situation outside the vehicle 10000 by the recognition unit 10073.

Note that the self-position estimation unit 10071 may estimate the self-position of the vehicle 10000 on the basis of the position information acquired by the position information acquisition unit 10024 and the sensor data from the vehicle sensor 10027.

Furthermore, each function of the map creation device 100 according to the present disclosure may be realized as a function in the self-position estimation unit 10071. In this case, the self-position estimation unit 10071 may create the obstacle location map as one of the local maps on the basis of the outputs of the 2D distance measurement sensor 10052 and the 3D distance measurement sensor 10053.

The sensor fusion unit 10072 performs sensor fusion processing of combining a plurality of different types of sensor data (for example, the image data supplied from the camera 10051 and the sensor data supplied from the 2D distance measurement sensor 10052) to obtain new information. Methods for combining different types of sensor data include integration, fusion, association, and the like.

The recognition unit 10073 executes detection processing for detecting a situation outside the vehicle 10000 and recognition processing for recognizing a situation outside the vehicle 10000.

For example, the recognition unit 10073 performs the detection processing and the recognition processing of the situation outside the vehicle 10000 on the basis of information from the external recognition sensor 10025, information from the self-position estimation unit 10071, information from the sensor fusion unit 10072, and the like.

Specifically, for example, the recognition unit 10073 performs the detection processing, the recognition processing, and the like of an object around the vehicle 10000. The object detection processing is, for example, processing of detecting the presence, size, shape, position, motion, and the like of an object. The object recognition processing is, for example, processing of recognizing an attribute such as a type of an object or identifying a specific object. However, the detection processing and the recognition processing are not necessarily clearly separated, and overlap in some cases.

For example, the recognition unit 10073 detects an object around the vehicle 10000 by performing clustering to classify point clouds based on sensor data by the 2D distance measurement sensor 10052, the 3D distance measurement sensor 10053, or the like into clusters of point clouds. As a result, the presence, size, shape, and position of the object around the vehicle 10000 are detected.

For example, the recognition unit 10073 detects the motion of the object around the vehicle 10000 by performing tracking that follows the motion of the mass of the point cloud classified by clustering. As a result, the speed and advancing direction (motion vector) of the object around the vehicle 10000 are detected.

For example, the recognition unit 10073 detects or recognizes a vehicle, a person, a bicycle, an obstacle, a structure, a road, a traffic light, a traffic sign, a road sign, and the like on the basis of the image data supplied from the camera 10051. Furthermore, the recognition unit 10073 may recognize the type of the object around the vehicle 10000 by performing recognition processing such as semantic segmentation.

For example, the recognition unit 10073 can perform the recognition processing of traffic rules around the vehicle 10000 on the basis of the map accumulated in the map information accumulation unit 10023, an estimation result of the self position by the self-position estimation unit 10071, and a recognition result of the object around the vehicle 10000 by the recognition unit 10073. Through this processing, the recognition unit 10073 can recognize the position and the state of the traffic light, the contents of the traffic sign and the road sign, the contents of the traffic regulation, the travelable lane, and the like.

For example, the recognition unit 10073 can perform the recognition processing of the surrounding environment of the vehicle 10000. As the surrounding environment to be recognized by the recognition unit 10073, the weather, temperature, humidity, brightness, a state of a road surface, and the like are assumed.

The action planning unit 10062 creates an action plan of the vehicle 10000. For example, the action planning unit 10062 creates the action plan by performing processing of path planning and path following.

Note that the path planning (Global path planning) is a process of planning a rough path from the start to the goal. This path planning includes processing of performing trajectory generation (Local path planning), which is called trajectory planning, that enables safe and smooth traveling in the vicinity of the vehicle 10000 in consideration of the motion characteristics of the vehicle 10000 in the planned path.

The path following is processing of planning a movement for safely and accurately traveling on a path planned by the global path planning within a planned time. For example, the action planning unit 10062 can calculate a target speed and a target angular velocity of the vehicle 10000 on the basis of the result of the path following processing.

The movement control unit 10063 controls the movement of the vehicle 10000 in order to realize the action plan created by the action planning unit 10062.

For example, the movement control unit 10063 controls a steering control unit 10081, a brake control unit 10082, and a drive control unit 10083 included in the vehicle control unit 10032 to be described later, and performs acceleration/deceleration control and direction control so that the vehicle 10000 travels on the trajectory calculated by the trajectory planning. For example, the movement control unit 10063 performs cooperative control for the purpose of implementing the functions of the ADAS such as collision avoidance or impact mitigation, follow-up traveling, vehicle speed maintaining traveling, collision warning of the own vehicle, lane deviation warning for the own vehicle, and the like. For example, the movement control unit 10063 performs cooperative control for the purpose of automatic driving or the like in which the vehicle autonomously travels without depending on the operation of the driver.

The DMS 10030 performs authentication processing of the driver, recognition processing of the state of the driver, and the like on the basis of the sensor data from the in-vehicle sensor 10026, input data input to the HMI 10031 to be described later, and the like. As the state of the driver to be recognized, for example, a physical condition, a wakefulness level, a concentration level, a fatigue level, a line-of-sight direction, a drunkenness level, a driving operation, a posture, and the like are assumed.

Note that the DMS 10030 may perform authentication processing of a passenger other than the driver and recognition processing of the state of the passenger. Furthermore, for example, the DMS 10030 may perform the recognition processing of the situation inside the vehicle on the basis of the sensor data from the in-vehicle sensor 10026. As the situation inside the vehicle to be recognized, for example, temperature, humidity, brightness, odor, and the like are assumed.

The HMI 10031 performs input of various types of data, instructions, and the like and presentation of the various types of data to the driver and the like.

The input of data by the HMI 10031 will be schematically described. The HMI 10031 includes an input device for a person to input data. The HMI 10031 generates an input signal on the basis of data, an instruction, or the like input by the input device, and supplies the input signal to each unit of the vehicle control system 10011. As the input device, the HMI 10031 includes an operator such as a touch panel, a button, a switch, and a lever. Not limited to this, the HMI 10031 may further include an input device that can perform input of information by a method other than manual operation, such as by voice and gesture. Furthermore, the HMI 10031 may use, for example, a remote control device using infrared rays or radio waves, or an external connection device such as a mobile device or a wearable device adapted to the operation of the vehicle control system 10011 as an input device.

The presentation of data by the HMI 10031 will be schematically described. The HMI 10031 generates visual information, auditory information, and tactile information for the passenger or the outside of the vehicle. In addition, the HMI 10031 performs output control for controlling output, output content, output timing, output method, and the like of each piece of generated information. As the visual information, the HMI 10031 generates and outputs, for example, an operation screen, a state display of the vehicle 10000, a warning display, an image such as a monitor image indicating the situation around the vehicle 10000, and information indicated by light. Further, as the auditory information, the HMI 10031 generates and outputs, for example, information indicated by sounds such as voice guidance, a warning sound, and a warning message. Further, as the tactile information, the HMI 10031 generates and outputs, for example, information given to the tactile sense of the passenger by, for example, force, vibration, motion, or the like.

As an output device from which the HMI 10031 outputs the visual information, for example, a display device that presents the visual information by displaying an image by itself or a projector device that presents visual information by projecting an image can be applied. Note that the display device may be a device that displays visual information in the field of view of the passenger, such as a head-up display, a transmissive display, or a wearable device having an augmented reality (AR) function, in addition to a display device having a normal display. In the HMI 10031, a display device included in a navigation device, an instrument panel, a Camera Monitoring System (CMS), an electronic mirror, a lamp, or the like provided in the vehicle 10000 can also be used as an output device that outputs the visual information.

As the output device from which the HMI 10031 outputs the auditory information, for example, an audio speaker, a headphone, or an earphone can be applied.

As the output device from which the HMI 10031 outputs the tactile information, for example, a haptic element using a haptic technology can be applied. The haptic element is provided, for example, at a portion with which the passenger of the vehicle 10000 comes into contact, such as a steering wheel or a seat.

The vehicle control unit 10032 controls each unit of the vehicle 10000. The vehicle control unit 10032 includes the steering control unit 10081, the brake control unit 10082, the drive control unit 10083, a body system control unit 10084, a light control unit 10085, and a horn control unit 10086.

The steering control unit 10081 performs detection, control, and the like of a state of a steering system of the vehicle 10000. The steering system includes, for example, a steering mechanism including a steering wheel and the like, an electric power steering, and the like. The steering control unit 10081 includes, for example, a steering ECU that controls a steering system, an actuator that drives the steering system, and the like.

The brake control unit 10082 performs detection, control, and the like of a state of a brake system of the vehicle 10000. The brake system includes, for example, a brake mechanism including a brake pedal, an Antilock Brake System (ABS), a regenerative brake mechanism, and the like. The brake control unit 10082 includes, for example, a brake ECU that controls the brake system, an actuator that drives the brake system, and the like.

The drive control unit 10083 performs detection, control, and the like of a state of a drive system of the vehicle 10000. The drive system includes, for example, a driving force generation device for generating a driving force such as an accelerator pedal, an internal combustion engine, or a driving motor, a driving force transmission mechanism for transmitting the driving force to wheels, and the like. The drive control unit 10083 includes, for example, a drive ECU that controls the drive system, an actuator that drives the drive system, and the like.

The body system control unit 10084 performs detection, control, and the like of a state of a body system of the vehicle 10000. The body system includes, for example, a keyless entry system, a smart key system, a power window device, a power seat, an air conditioner, an airbag, a seat belt, a shift lever, and the like. The body system control unit 10084 includes, for example, a body system ECU that controls the body system, an actuator that drives the body system, and the like.

The light control unit 10085 performs detection, control, and the like of a state of various lights of the vehicle 10000. As the light to be controlled, for example, a headlight, a backlight, a fog light, a turn signal, a brake light, a projection, a display of a bumper, and the like are assumed. The light control unit 10085 includes a light ECU that controls the light, an actuator that drives the light, and the like.

The horn control unit 10086 performs detection, control, and the like of a state of a car horn of the vehicle 10000. The horn control unit 10086 includes, for example, a horn ECU that controls the car horn, an actuator that drives the car horn, and the like.

Figure 22:
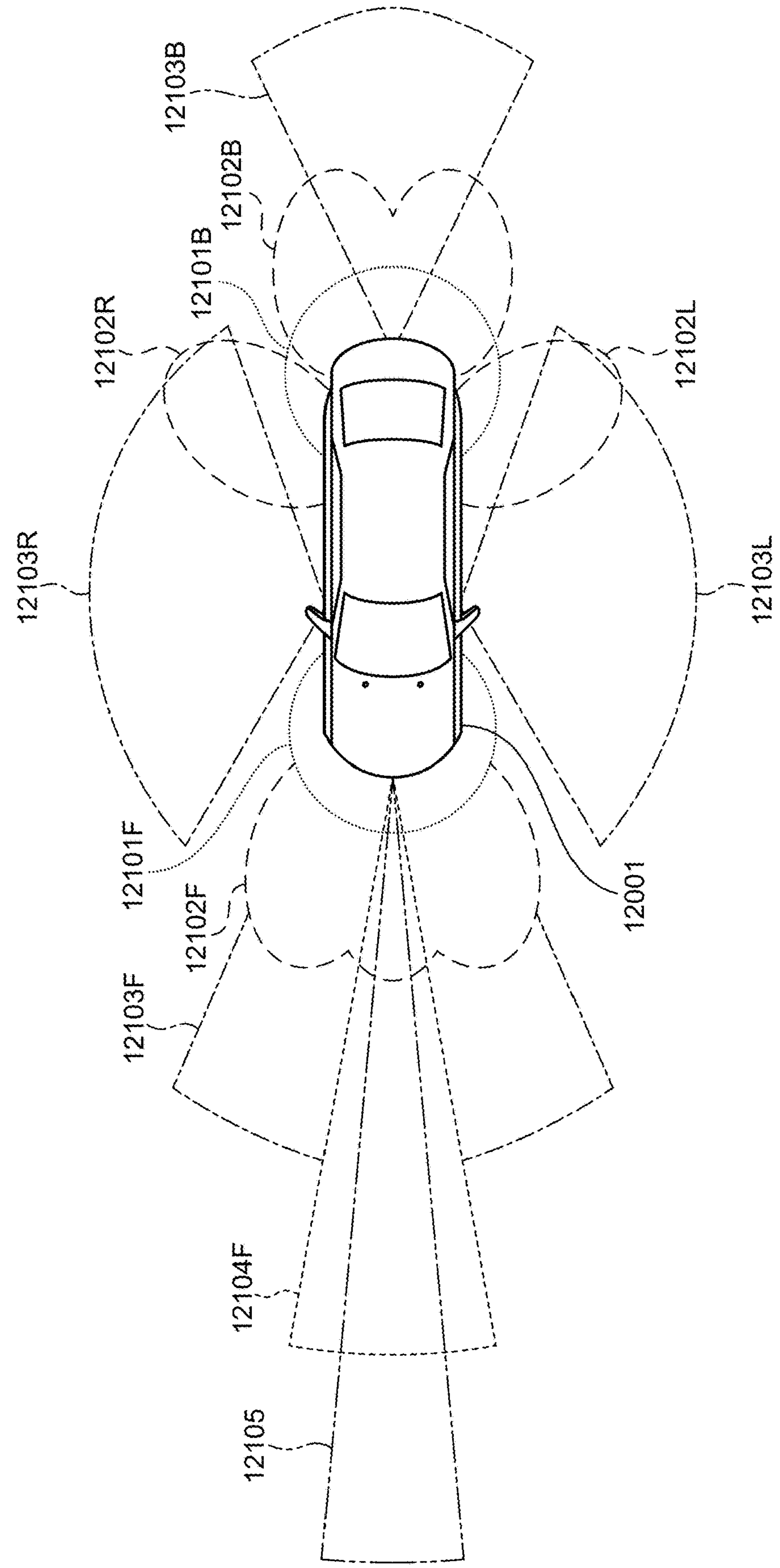
FIG. 22 is a diagram illustrating an example of a sensing area.

FIG. 22 is a diagram illustrating an example of sensing areas by the camera 10051, the 2D distance measurement sensor 10052, the 3D distance measurement sensor 10053, the ultrasonic sensor 10054, and the like of the external recognition sensor 10025 in FIG. 21. Note that FIG. 22 schematically illustrates a state in which the vehicle 10000 (12001) is viewed from above, in which a left end side is a front end (front) side of the vehicle 10000 and a right end side is a rear end (rear) side of the vehicle 10000.

A sensing area 12101F and a sensing area 12101B illustrate examples of the sensing area of the ultrasonic sensor 10054. The sensing area 12101F covers the periphery of the front end of the vehicle 10000 by the plurality of ultrasonic sensors 10054. The sensing area 12101B covers the periphery of the rear end of the vehicle 10000 by the plurality of ultrasonic sensors 10054.

Sensing results in the sensing area 12101F and the sensing area 12101B are used, for example, for parking assistance of the vehicle 10000.

A sensing area 12102F to a sensing area 12102B illustrate examples of the sensing area of the 2D distance measurement sensor 10052 for a short distance or a middle distance. The sensing area 12102F covers a position farther than the sensing area 12101F in front of the vehicle 10000. The sensing area 12102B covers a position farther than the sensing area 12101B in the rear of the vehicle 10000. The sensing area 12102L covers the rear periphery of the left side surface of the vehicle 10000. The sensing area 12102R covers the rear periphery of the right side surface of the vehicle 10000.

The sensing result in the sensing area 12102F is used, for example, for detecting a vehicle or a pedestrian that is present in front of the vehicle 10000. The sensing result in the sensing area 12102B is used, for example, for a collision prevention function or the like in the rear of the vehicle 10000. The sensing results in the sensing area 12102L and the sensing area 12102R are used, for example, for detecting an object that is present in a blind spot on the side of the vehicle 10000.

A sensing area 12103F to a sensing area 12103B illustrate examples of the sensing area of the camera 10051. The sensing area 12103F covers a position farther than the sensing area 12102F in front of the vehicle 10000. The sensing area 12103B covers a position farther than the sensing area 12102B in the rear of the vehicle 10000. The sensing area 12103L covers the periphery of the left side surface of the vehicle 10000. The sensing area 12103R covers the periphery of the right side surface of the vehicle 10000.

The sensing result in the sensing area 12103F can be used for, for example, recognition of a traffic light or a traffic sign, a lane deviation prevention assist system, and an automatic headlight control system. The sensing result in the sensing area 12103B can be used for, for example, parking assistance and a surround view system. The sensing results in the sensing area 12103L and the sensing area 12103R can be used for, for example, the surround view system.

A sensing area 12104F illustrates an example of the sensing area of the 3D distance measurement sensor 10053. The sensing area 12104F covers a position farther than the sensing area 12103F in front of the vehicle 10000. On the other hand, the sensing area 12104F has a narrower range in the left-right direction than the sensing area 12103F.

The sensing result in the sensing area 12104F is used, for example, for detecting an object such as a surrounding vehicle.

A sensing area 12105 illustrates an example of the sensing area of the 2D distance measurement sensor 10052 for a long distance. The sensing area 12105 covers a position farther than the sensing area 12104F in front of the vehicle 10000. On the other hand, the sensing area 12105 has a narrower range in the left-right direction than the sensing area 12104F.

The sensing result in the sensing area 12105 is used for, for example, Adaptive Cruise Control (ACC), emergency braking, collision avoidance, and the like.

Note that the sensing areas of the respective sensors of the camera 10051, the 2D distance measurement sensor 10052, the 3D distance measurement sensor 10053, and the ultrasonic sensor 10054 included in the external recognition sensor 10025 may have various configurations other than those in FIG. 22. Specifically, the ultrasonic sensor 10054 may also sense the side of the vehicle 10000, or the 3D distance measurement sensor 10053 may sense the rear of the vehicle 10000. In addition, the installation position of each sensor is not limited to each example described above. The number of sensors may be one or more.

Note that the effects described in the present description are merely examples and are not limited, and other effects may be provided.

Note that the present technology can also have the following configurations.

(1) An information processing apparatus comprising a detection unit that detects an obstacle location that becomes obstruction for traveling in a traveling direction on a basis of a three-dimensional point cloud determined to be a traveling surface and a two-dimensional point cloud corresponding to the traveling direction.

(2) The information processing apparatus according to the above (1), wherein the detection unit determines the traveling surface on a basis of a normal line-added point cloud added with normal line information of a normal line estimated for every point included in a plane, the plane being specified on a basis of the three-dimensional point cloud.

(3) The information processing apparatus according to the above (2), wherein the detection unit determines whether each of divided areas is one of the obstacle location and the traveling surface on a basis of height information of points included in each of the divided areas, the divided areas being obtained by dividing a point cloud obtained by integrating the normal line-added point cloud and the two-dimensional point cloud by a grid having a predetermined size.

(4) The information processing apparatus according to the above (3), wherein, in a case where a target area that is a divided area to be a target among the divided areas does not include the normal line information, the detection unit determines whether the target area is one of the obstacle location and the traveling surface on a basis of height information of points included in the target area and a divided area having the normal line information among the divided areas around the target area.

(5) The information processing apparatus according to the above (3) or (4), wherein, in a case where all of the divided areas around a target area that is a divided area to be a target among the divided areas do not include the normal line information, the detection unit determines that the target area includes the obstacle location.

(6) The information processing apparatus according to any one of the above (2) to (5), wherein the detection unit determines the traveling surface further on a basis of a component in a gravity direction of the normal line.

(7) The information processing apparatus according to any one of the above (2) to (6), wherein the detection unit specifies the plane on a basis of a first principal component and a second principal component acquired by principal component analysis on the three-dimensional point cloud.

(8) The information processing apparatus according to any one of the above (1) to (7), wherein the three-dimensional point cloud is a point cloud obtained from one or more three-dimensional distance measurement sensors, and the two-dimensional point cloud is a point cloud obtained from one or more two-dimensional distance measurement sensors.

(9) The information processing apparatus according to the above (8), wherein the three-dimensional point cloud is a point cloud generated on a basis of a signal acquired by each of reception elements arranged in a predetermined array and included in the three-dimensional distance measurement sensor.

(10) The information processing apparatus according to the above (8) or (9), wherein the two-dimensional point cloud is a point cloud generated by the two-dimensional distance measurement sensor on a basis of a plane having a predetermined height with respect to the traveling surface as a starting point and being substantially parallel or having a predetermined angle with respect to the traveling surface.

(11) The information processing apparatus according to any one of the above (1) to (10), further comprising a map generation unit that generates a map based on two-dimensional information on a basis of information indicating the obstacle location detected by the detection unit.

(12) The information processing apparatus according to the above (11), further comprising a travel control unit that controls traveling of a mobile body on a basis of the map generated by the map generation unit.

(13) An information processing method executed by a processor, the method comprising a detection step of detecting an obstacle location that becomes obstruction for traveling in a traveling direction on a basis of a three-dimensional point cloud determined to be a traveling surface and a two-dimensional point cloud corresponding to the traveling direction.

(14) An information processing program causing a computer to execute a detection step of detecting an obstacle location that becomes obstruction for traveling in a traveling direction on a basis of a three-dimensional point cloud determined to be a traveling surface and a two-dimensional point cloud corresponding to the traveling direction.

REFERENCE SIGNS LIST

10, 500 MOBILE BODY
11 3D DISTANCE MEASUREMENT SENSOR
12 2D DISTANCE MEASUREMENT SENSOR
21, 22 DISTANCE MEASUREMENT RANGE
30, 520 TRAVELING SURFACE
31, 521 SLOPE
32 DEPRESSION
33 STEP
60, 60*a*, 60*b*, 60*c* NORMAL LINE
70 PLANE
100 MAP CREATION DEVICE
110 NORMAL LINE ESTIMATION UNIT
120 OBSTACLE LOCATION DETERMINATION UNIT
121 NORMAL LINE INFORMATION PROCESSING UNIT
122 SENSOR INFORMATION INTEGRATION UNIT
123 HEIGHT DIFFERENCE CALCULATION UNIT

124 POINT CLOUD INTEGRATION UNIT
130 MAP CREATION UNIT
200 TRAVEL CONTROL SYSTEM
300 PRIOR INFORMATION
400 PIXEL
400T TARGET PIXEL
400N NEIGHBORING PIXEL
410, 410*a*, 410*b*, 410*c* DIVIDED AREA
420*a*, 420*b*, 430*a*, 430*b*, 430*c*, 431*a*, 431*c*, 431*d*, 431*e*, 431*f*, 431*g*, 431*i* POINT
540$a_1$, 540$a_2$, 540$b_1$, 540$b_2$, 540*c*, 540$d_1$, 540$d_2$ OBSTACLE LOCATION

The invention claimed is:

1. An information processing apparatus, comprising:
processing circuitry configured to
detect an obstacle location that becomes an obstruction for traveling in a traveling direction on a basis of (i) a three-dimensional point cloud determined to be a traveling surface and (ii) a two-dimensional point cloud corresponding to the traveling direction;
estimate a normal line for every point included in a plane specified on a basis of the three-dimensional point cloud;
correct a direction of one of the normal lines such that an inner product of a vector from a sensor to a target point and a normal vector of the target point becomes negative;
determine a normal line-added point cloud with normal line information of the normal line estimated for every point included in the plane, the normal line information including continuous values of the three-dimensional point cloud;
determine the traveling surface on a basis of the normal line-added point cloud;
generate a map based on two-dimensional information on a basis of information indicating the obstacle location; and
control travelling of a mobile body on a basis of the map.

2. The information processing apparatus according to claim 1, wherein the processing circuitry is configured to determine whether each of divided areas is one of the obstacle location and the traveling surface on a basis of height information of points included in each of the divided areas, the divided areas being obtained by dividing a point cloud obtained by integrating the normal line-added point cloud and the two-dimensional point cloud by a grid having a predetermined size.

3. The information processing apparatus according to claim 2, wherein
in a case where a target area that is a divided area to be a target among the divided areas does not include the normal line information, the processing circuitry is configured to determine whether the target area is one of the obstacle location and the traveling surface on a basis of height information of points included in the target area and a divided area having the normal line information among the divided areas around the target area.

4. The information processing apparatus according to claim 2, wherein
in a case where all of the divided areas around a target area that is a divided area to be a target among the divided areas do not include the normal line information, the processing circuitry is configured to determine that the target area includes the obstacle location.

5. The information processing apparatus according to claim 1, wherein the processing circuitry is configured to determine the traveling surface further on a basis of a component in a gravity direction of the normal line.

6. The information processing apparatus according to claim 1, wherein
the processing circuitry is configured to specify the plane on a basis of a first principal component and a second principal component acquired by principal component analysis on the three-dimensional point cloud.

7. The information processing apparatus according to claim 1, wherein
the three-dimensional point cloud is a point cloud obtained from one or more three-dimensional distance measurement sensors, and
the two-dimensional point cloud is a point cloud obtained from one or more two-dimensional distance measurement sensors.

8. The information processing apparatus according to claim 7, wherein the three-dimensional point cloud is a point cloud generated on a basis of a signal acquired by each of reception elements arranged in a predetermined array and included in the one or more three-dimensional distance measurement sensors.

9. The information processing apparatus according to claim 7, wherein the two-dimensional point cloud is a point cloud generated by the one or more two-dimensional distance measurement sensors on a basis of a plane having a predetermined height with respect to the traveling surface as a starting point and being substantially parallel or having a predetermined angle with respect to the traveling surface.

10. An information processing method executed by a processor, the method comprising:
detecting an obstacle location that becomes an obstruction for traveling in a traveling direction on a basis of (i) a three-dimensional point cloud determined to be a traveling surface and (ii) a two-dimensional point cloud corresponding to the traveling direction;
estimating a normal line for every point included in a plane specified on a basis of the three-dimensional point cloud;
correcting a direction of one of the normal lines such that an inner product of a vector from a sensor to a target point and a normal vector of the target point becomes negative;
determining a normal line-added point cloud with normal line information of the normal line estimated for every point included in the plane, the normal line information including continuous values of the three-dimensional point cloud;
determining the traveling surface on a basis of the normal line-added point cloud;
generating a map based on two-dimensional information on a basis of information indicating the obstacle location; and
controlling travelling of a mobile body on a basis of the map.

11. A non-transitory computer readable medium storing an information processing program that when executed by a computer causes the computer to execute a method, the method comprising:
detecting an obstacle location that becomes an obstruction for traveling in a traveling direction on a basis of (i) a three-dimensional point cloud determined to be a traveling surface and (ii) a two-dimensional point cloud corresponding to the traveling direction;
estimating a normal line for every point included in a plane specified on a basis of the three-dimensional point cloud;

correcting a direction of one of the normal lines such that an inner product of a vector from a sensor to a target point and a normal vector of the target point becomes negative;

determining a normal line-added point cloud with normal line information of the normal line estimated for every point included in the plane, the normal line information including continuous values of the three-dimensional point cloud;

determining the traveling surface on a basis of the normal line-added point cloud;

generating a map based on two-dimensional information on a basis of information indicating the obstacle location; and controlling travelling of a mobile body on a basis of the map.

12. The information processing apparatus according to claim 1, wherein the continuous values of the three-dimensional point cloud include a normal vector of the normal line.

13. The information processing apparatus according to claim 1, wherein the continuous values of the three-dimensional point cloud include an angle of the normal line.

14. The information processing apparatus according to claim 1, wherein the processing circuitry is configured to estimate the normal line for the target point based on coordinate data of the target point and coordinate data of neighboring points of the target point.

15. The information processing apparatus according to claim 6, wherein the processing circuitry is configured to perform the principal component analysis using data of points acquired from the target point and neighboring points of the target point to estimate the normal line for the target point.

16. The information processing apparatus according to claim 1, wherein the processing circuitry is configured to determine whether each point of the normal line-added point cloud constitutes the traveling surface by comparing the continuous values of the normal line information to a predetermined threshold.

* * * * *